United States Patent [19]

Miler et al.

[11] Patent Number: 5,017,284

[45] Date of Patent: May 21, 1991

[54] FLUID PURIFYING APPARATUS AND METHOD OF PURIFYING FLUIDS

[75] Inventors: Steven L. Miler, Shelbyville; Ronald L. Wathen; Raymond E. Palazzo, Jr., both of Louisville, all of Ky.

[73] Assignee: Environmental Water Technology, Inc., Louisville, Ky.

[21] Appl. No.: 515,459

[22] Filed: Apr. 27, 1990

[51] Int. Cl.$^5$ .............................................. B01D 61/08
[52] U.S. Cl. ...................................... 210/97; 210/175; 210/195.2; 210/251; 210/257.2; 210/321.67; 210/321.69
[58] Field of Search .................. 210/85, 86, 87, 90, 210/97, 103, 104, 105, 109, 110, 112, 114, 115, 116, 130, 134, 137, 143, 143.1, 182, 175, 181, 194, 195.2, 251, 257.2, 294, 295, 322, 321.6, 321.65, 321.69

[56] References Cited

U.S. PATENT DOCUMENTS

| | | |
|---|---|---|
| 3,089,513 | 5/1936 | Kirk, Jr. . |
| 4,604,194 | 8/1986 | Entingh . |
| 4,752,389 | 7/1981 | Burrows . |
| 4,769,131 | 9/1988 | Noll . |
| 4,784,771 | 11/1988 | Wathen et al. . |

*Primary Examiner*—Frank Sever

[57] ABSTRACT

A liquid purification arrangement comprising a housing having an ambient inlet and lineally extending exhaust passage between the housing wall and a drain pan, the housing having a liquid inlet and outlet for a liquid system disposed within the housing which system includes a pump to move the liquid in the system, a blower, an orificed, looped liquid circuit and filtering arrangement, a moveable frame support, a disinfection/rejuvenation receptacle, an ultra-violet and distillation microbial reduction arrangement, a heating and cooling storage arrangement with a collapsible-expansible storage bag and switch arrangement therefor, and a check and alternating valve arrangement.

42 Claims, 17 Drawing Sheets

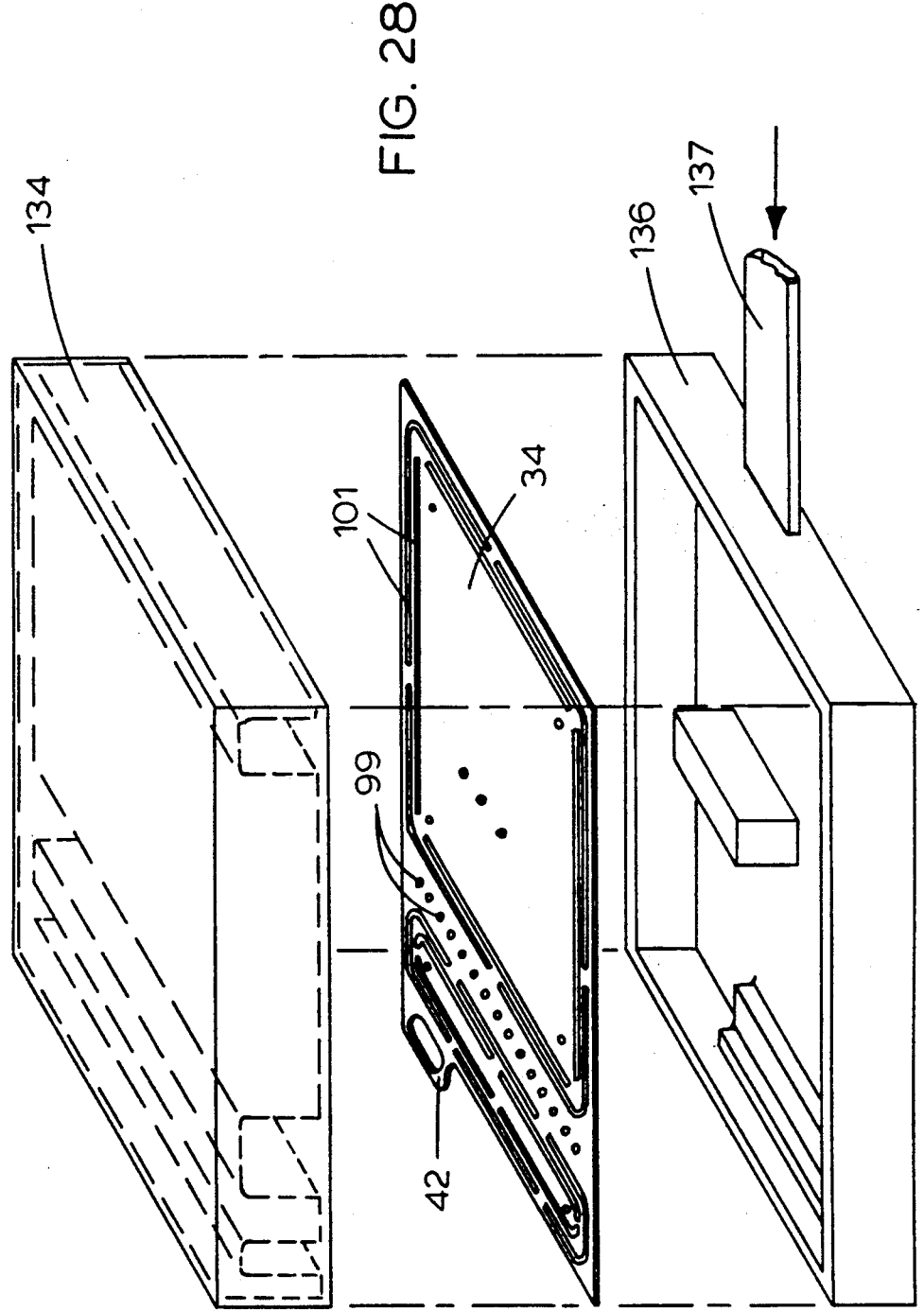

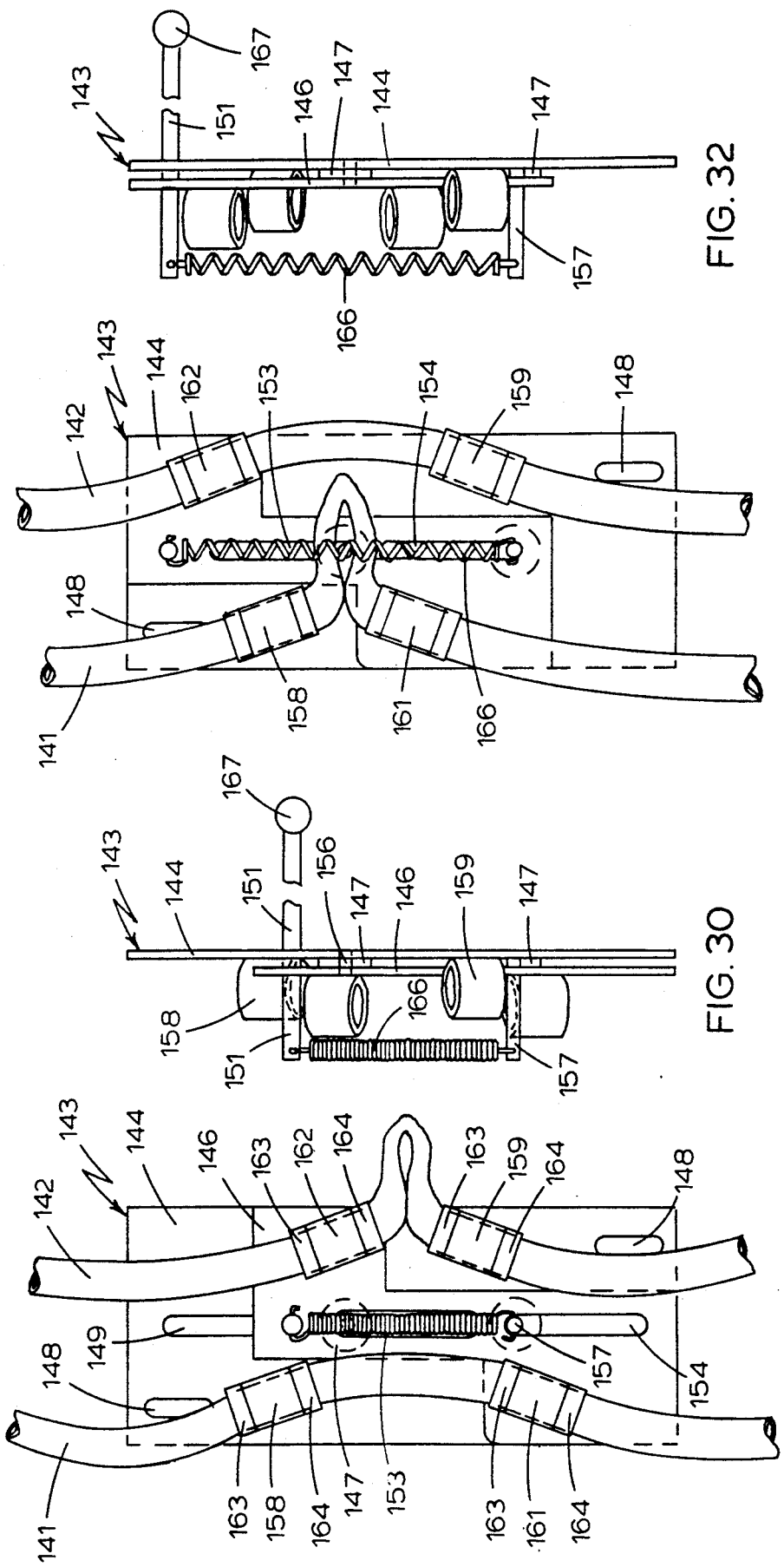

FLUID PURIFYING APPARATUS AND METHOD OF PURIFYING FLUIDS

BACKGROUND OF THE INVENTION

The present invention relates to fluid purifying apparatus for purifying fluids and more particularly to a novel, compact structure suitable for purifying liquids such as water and to a novel method of accomplishing such liquid purification.

It presently is known in the art of fluid purification to include in a fluid purifying system an arrangement for passing fluid to be purified such as liquid water from the feed side of a reverse osmosis unit to the product side of the reverse osmosis unit and then to an ultimate user during a purifying cycle and then, during a treatment cycle of the reverse osmosis unit, which treatment cycle includes disinfection/rejuvenation, to recirculate the liquid from the product side of the reverse osmosis unit back to the feed side in by-pass relation to the reverse osmosis unit in order to introduce suitable treating fluids through separate jugs or containers to disinfect and rejuvenate the system. Such a so-called "loop system" arrangement can be seen in U.S. Pat. No. 4,784,771, issued to Ronald L. Wathen, et al. on Nov. 15, 1988. It also is known in the fluid purification art to utilize, before and after a fluid filtering means, which includes a carbon filter, an ultra-violet light-emitting tube, attention being directed to U.S. Pat. No. 4,769,131, issued to J.R. Noll on Sept. 6, 1988. Further, it is known in the fluid purification art to utilize a thermoelectric heat transfer module in such a manner that the cool side thereof is in thermal communication with a purified fluid, such as water contained in a storage chamber, a tap water and waste water supply being utilized to carry heat energy away from the hot side of the heat transfer module. Attention, in this regard, is being directed to U.S. Pat. No. 4,752,389, issued to Bruce D. Burrows on July 21, 1988. Finally, it is generally known to utilize an expandable fluid chamber within a confined zone with sensing and actuating means to control fluid flow to the chamber when the chamber reaches an expanded level, attention being directed to U.S. Pat. Nos. 3,089,513, issued to C.H. Kirk, Jr. on May 14, 1936 and No. 4,604,194, issued to M.E. Engingh on Aug. 5, 1986.

Recognizing the limitations of these several aforenoted structures and further recognizing the need for a highly efficient, compact fluid purification apparatus particularly adapted for water purification, the present invention provides a fluid purification apparatus and method of purifying a fluid, such as water, which allows for ready, efficient, and economical manufacture, assembly, shipping, storage, maintenance and use. More specifically, the present invention provides for an improved flow-through housing arrangement for a water purification system which allows for ready, uniform ambient air flushing and cooling of several select parts of the system with a unique arrangement for diverting and exhausting outlet air from the system with a minimum of noise and air intrusion, utilizing the housing and liquid drain receptacle to accomplish the same and at the same time allowing ready removal of the drain receptacle. Further, the present invention provides for an improved, economical flow control in a reverse osmosis treatment loop and for a unique, unitary disinfection and rejuvenation container in such reverse osmosis treatment loop of a water purification system, the container being of unitary stable and balanced construction and yet allowing for ready alternative selection and introduction of disinfection and rejuvenation fluids into the treatment loop. In addition the present invention provides for a unique arrangement for treating fluids in a fluid purification system with ultra-violet radiation before the system pump, after the reverse osmosis purification and after storage but before tap usage in the system. Also, the present invention provides a novel fluid storage and bag assembly arrangement, including a unique arrangement for controlling, heating and cooling fluid in the storage arrangement and a unique modification for heating fluid in a storage chamber to purify the same for distillation introduction into a cold storage chamber, the cold and heated chambers utilizing the cool and hot sides of a thermoelectric module respectively in the treatment of the liquid, with the purifying effects of distillation in the modification serving in place of and/or in conjunction with a novel step of ultra-violet radiation treatment before passage to tap use. Moreover, the present invention provides a novel compact and efficient structural arrangement for mounting a hinged housing cover which nestingly receives the liquid tap and a novel arrangement for mounting the pump and filters included in the liquid filtration system so as to provide a compact, balanced unit assembly which isolates residual vibrations of the pump in the housing in which the assembly is disposed. In addition, the present invention provides novel, straightforward and economical to manufacture fluid flow control apparatus, eliminating costly check and solenoid valves otherwise required.

Various other features of the present invention will become obvious to one skilled in the art upon reading the disclosure set forth herein.

BRIEF SUMMARY OF THE INVENTION

More particularly, the present invention provides a liquid purification apparatus comprising: walled housing means having an ambient inlet opening therein, the housing means defining a plenum chamber preselectively sized to compactly contain a liquid purification system therein to communicatively extend between a liquid inlet and a liquid outlet in the wall housing means, the liquid purification system including a pump to move the liquid from the liquid inlet to the liquid outlet, a liquid storage receptacle having a heat transfer means with a heat exchange element associated therewith and a blower mounted in the chamber in communication with the ambient inlet opening in the walled housing means to circulate air over the heat exchange element; a walled drain receptacle communicatively positioned below the plenum chamber with the side walls thereof in spaced relation to the walled housing means to define an air exhaust passage therebetween, the drain receptacle serving to receive and evaporate condensed liquids from the liquid purification system in the plenum chamber thereabove with the air exhaust passage being sized and positioned adjacent to the bottom periphery of the walled housing means to serve as a dispersing and sound baffling exhaust for air circulated by the blower over the heat exchange element and through the remainder of the liquid purification system. In addition, the present invention provides for a liquid purification system which includes a filter membrane, a storage receptacle and tap downstream the storage receptacle with ultra-violet treating apparatus before the filter, between the filter and storage receptacle and between the storage receptacle and the tap. Further, the present invention provides not only a novel, insulated sandwiched plate storage receptacle but also a thin collapsible-expansible gas and liquid storage bag assembly arrangement in the receptacle with a unique planar switch apparatus to control liquid flow to the bag, the storage bag arrangement including at least two fluid connected bags, one for storing hot fluids and the other cold fluids. In the present invention, the two assembled hot and cold bags are uniquely arranged to allow further purification of the liquid therein, either through the aforedescribed ultra-violet radiation apparatus or through a novel distillation of the liquid as it passes from the hot to the cold chamber. Moreover, the present invention utilizes a unique reverse osmosis loop system in the course of liquid purification, the loop system including a novel arrangement for controlling liquid flow in the primary and drain circuits, as well as a novel unitary container for alternatively introducing disinfection/rejuvenation treatment fluids into the system. The present invention also provides a unique and novel method and a modification thereof for liquid purification the combined steps of which can be in association with the novel apparatus described herein. Further, the present invention provides a novel arrangement which reduces pump vibration by uniquely isolating the pump from the housing in which it is disposed. In addition, the present invention provides unique fluid control mechanism for the purification system, including novel flow check and alternative flow control arrangements.

It is to be understood that various changes can be made by one skilled in the art in one or more of the several parts of the novel apparatus described herein and in one or more of the several steps of the unique method herein described without departing from the scope or spirit of the present invention.

BRIEF DESCRIPTION OF THE DRAWINGS

Referring to the several figures of the drawings which illustrate both schematically and in detail, an advantageous embodiment of the present invention and novel modifications thereof:

FIG. 28 is an exploded schematic view of a mold method employed in forming the storage receptacle of FIG. 19 including the novel plate member of FIG. 20; and, FIGS. 29-32 schematically disclose plan and partial side views of two stages of a novel fluid flow control arrangement for the two conduits connecting hot and cold storage bag members to the user tap, FIGS. 29 and 30 illustrating the cold fluid flow conduit in open position and the hot fluid flow conduit in closed position and FIGS. 31 and 32 illustrating the reverse condition.

DETAILED DESCRIPTION OF THE DRAWINGS

Figure 1:
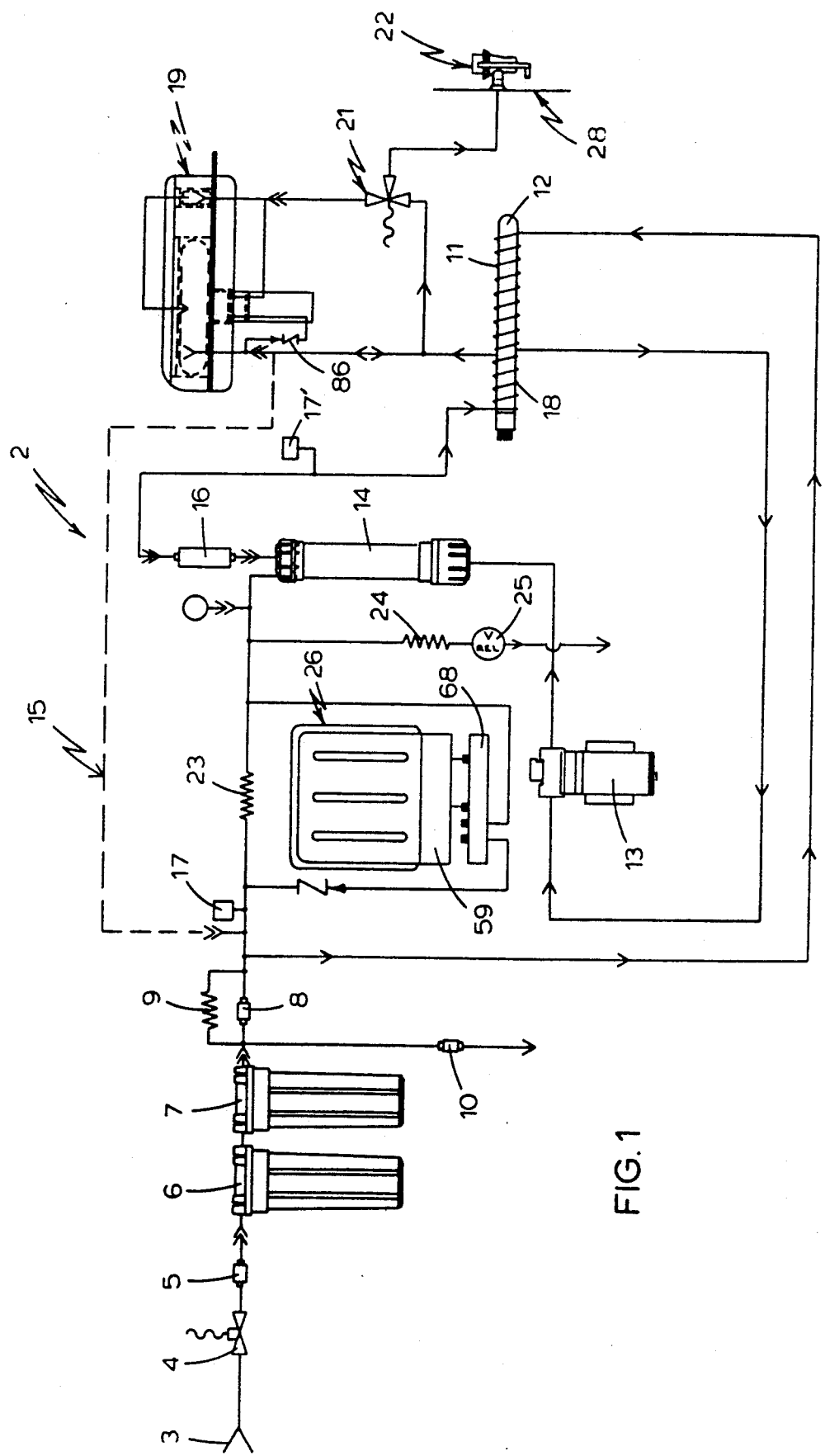
FIG. 1 is a schematic flow diagram of conduit circuitry between the several parts of one advantageous embodiment of the inventive liquid purifying apparatus disclosing the several parts incorporated into the purifying apparatus and the novel features included therein.

Referring to the schematic flow diagram of FIG. 1, liquid to be purified, usually contaminant and bacterial-laden water, from an available supply source (not shown) is introduced into the novel liquid purification system broadly referred to herein by reference number 2 at system inlet 3 of a suitable chemically-resistant plastic tubing, such as a polyethylene tubing. The liquid to be purified passes along the tubing through an opened solenoid valve 4 through ball control shut-off valve 5 which is maintained in open position during normal liquid purification and treatment cycles into the tapered cylindrical prefilter housing 6 which can be of a suitable chemically-resistant plastic material and which contains a suitable particulate-removing material—such as a spun polypropylene of a preselected porosity and depth. From prefilter housing 6, the liquid passes into a second tapered cylindrical housing 7 which also is of a suitable chemically-resistant plastic material and which contains a suitable porous bacteriostatic metal alloy material of preselected porosity and depth and which is capable of releasing copper ions into the liquid stream to arrest bacterial growth. It is to be understood that a commercially-available material, such as one referred to as "KDF," available from the Chemtree Company, can be used along with a suitable and commercially-available granulatar-activated carbon. It further is to be understood that the depth and porosity of the material selected can vary depending upon the nature of the liquid to be treated including such parameters as PH level, hardness and turbidity. From ion-adding filter 7, the liquid passes through ball control valve 8 which is maintained in opened position during a normal liquid purification cycle and which is held closed during a disinfection/rejuvenation treatment cycle of the reverse osmosis unit, described hereinafter. In a typical operation, liquid to be purified is introduced into inlet 3 at a volume flow rate of approximately nine hundred (900) to one thousand (1,000) cubic centimeters per minute. During the disinfection/rejuvenation treatment cycle, which is broadly similar to the inventive "loop cycle" as described in aforementioned U.S. Pat. No. 4,784,771, ball control valve 8 is closed and a small amount of feed liquid in the approximate volume flow rate range of seventy-five (75) cubic centimeters per minute is passed through a restrictor orifice 9 which can be made from any one of a number of suitably-porous materials, such as the commercially-available "POREX" material. It is to be noted that a suitable ball-controlled drain valve 10 can be provided before valve 8 to relieve static pressure when desired.

During normal flow operation, the liquid to be treated is passed through helically-wound section 11 surrounding a portion of an ultra-violet radiation tube 12 which advantageously can have a wave length of two hundred and fifty-four (254) nanometers and be non-ozone producing. The liquid then passes through a pump 13 to the feed side of a reverse osmosis unit 14. Pump 13 advantageously can be a commercially-available triple diaphragm, positive displacement pump which serves to minimize pump shear and in turn, temperature increase of the treated liquid during the treatment cycle and to maximize flow rate through the reverse osmosis membrane. From the feed side of the reverse osmosis unit 14, treated liquid passes through a flow meter 16 and a second conductivity probe 17 for measuring water quality—the first conductivity probe 17 being upstream in "loop cycle" 15—to a second helically-wound section 18 also surrounding a portion of ultra-violet radiation tube 12. After a second ultra-violet radiation treatment, the liquid is passed to a unique compartmentalized storage receptacle 19 described in detail hereinafter—which receptacle is capable of heating and/or cooling the liquid to be passed on through a three-way solenoid control 21 to a user tap 22. As is described hereinafter, a novel manually operable fluid flow control mechanism can be utilized, in accordance with the present invention for valve 21.

Figure 2:
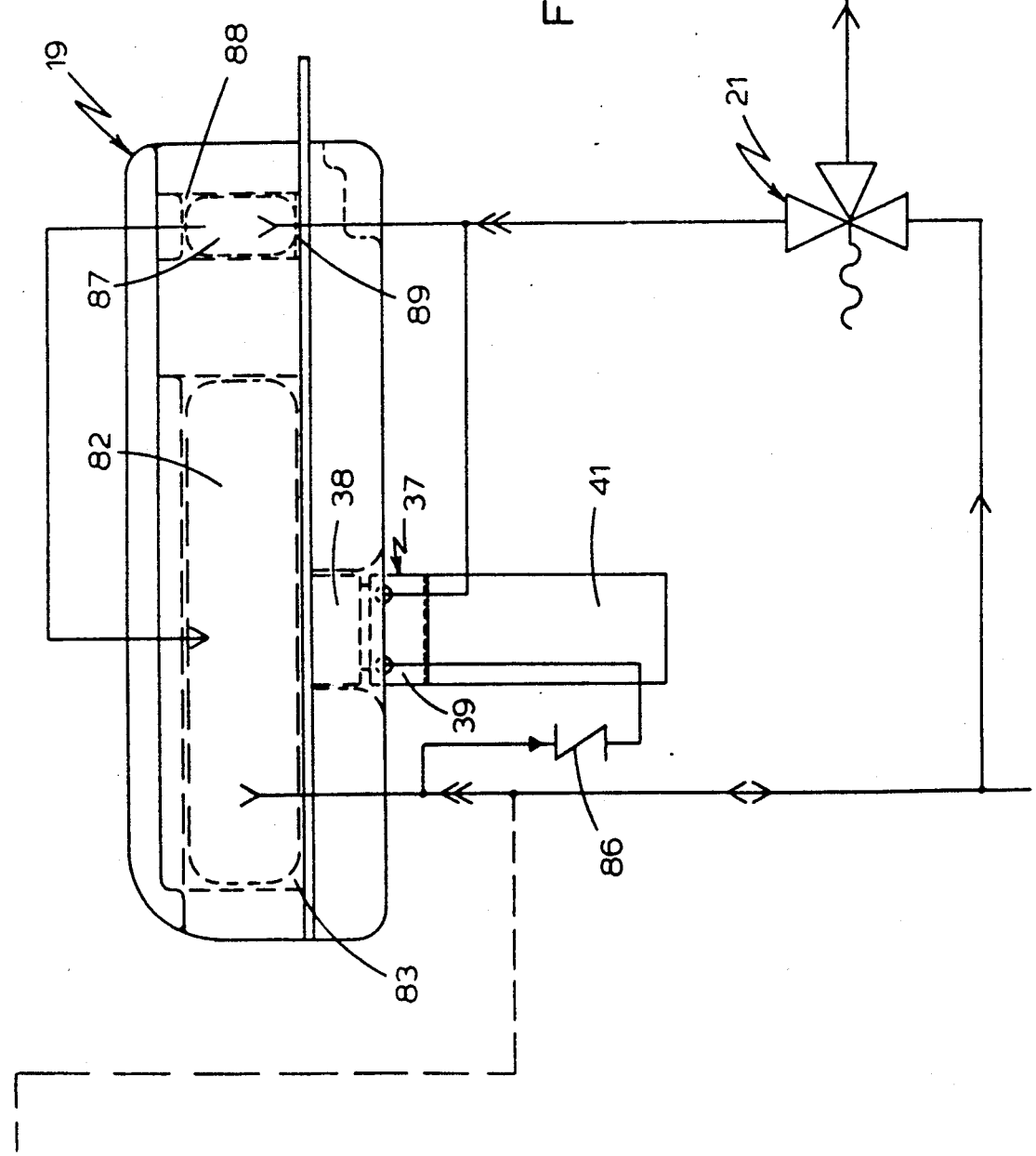
FIG. 2 is an enlarged portion of FIG. 1, disclosing further details of the novel storage receptacle and conduit circuitry included in the flow diagram of FIG. 1.

As above noted, the reverse osmosis unit 14 can be intermittently treated in "loop cycle" 15 in a manner similar to that described in U.S. Pat. No. 4,784,771 and therefore not described in detail herein. However, in accordance with the present invention, additional novel features are now included in the "loop cycle" which allows for a straightforward and economical manner of controlling the rate at which the reverse osmosis unit 14 compacts. This is accomplished through two novel restrictor orifices 23 and 24 respectively which, like restrictor orifice 9, can be economically manufactured from any one of a number of suitable porous materials, such as a material sold by the Porex Company, and which is of preselected porosity to allow a preselected variable resistance to liquid flow between restrictive orifices 23 and 24. Advantageously, restrictor orifice 23, which is downstream the first conductivity probe 17 in the main line of the loop cycle can be selected to allow a flow volume rate of approximately three (3) liters or three thousand (3,000) cubic centimeters per minute and restrictor orifice 24 in the drain line can be selected to allow a smaller flow volume rate of eight hundred and fifty (850) cubic centimeters per minute with a higher ratio between orifices 23 and 24 generally allowing for a more efficient recovery of product water but of lower quality. In addition to the novel restrictor orifice arrangement 23 and 24, the new "loop cycle" also includes a suitable pressure relief valve 25 in the drain line to seal against drain flow during the treatment cycle and a unique and novel treatment container arrangement 26 which provides a unitary container for alternative introduction of disinfection/rejuvenation fluids from one of two compartments in the same container—all in a manner described in detail hereinafter. Also described in detail hereinafter is the flow of fluid through the separate compartments of the compartmentalized storage receptacle 19 (FIGS. 1 and 2).

Figure 3:
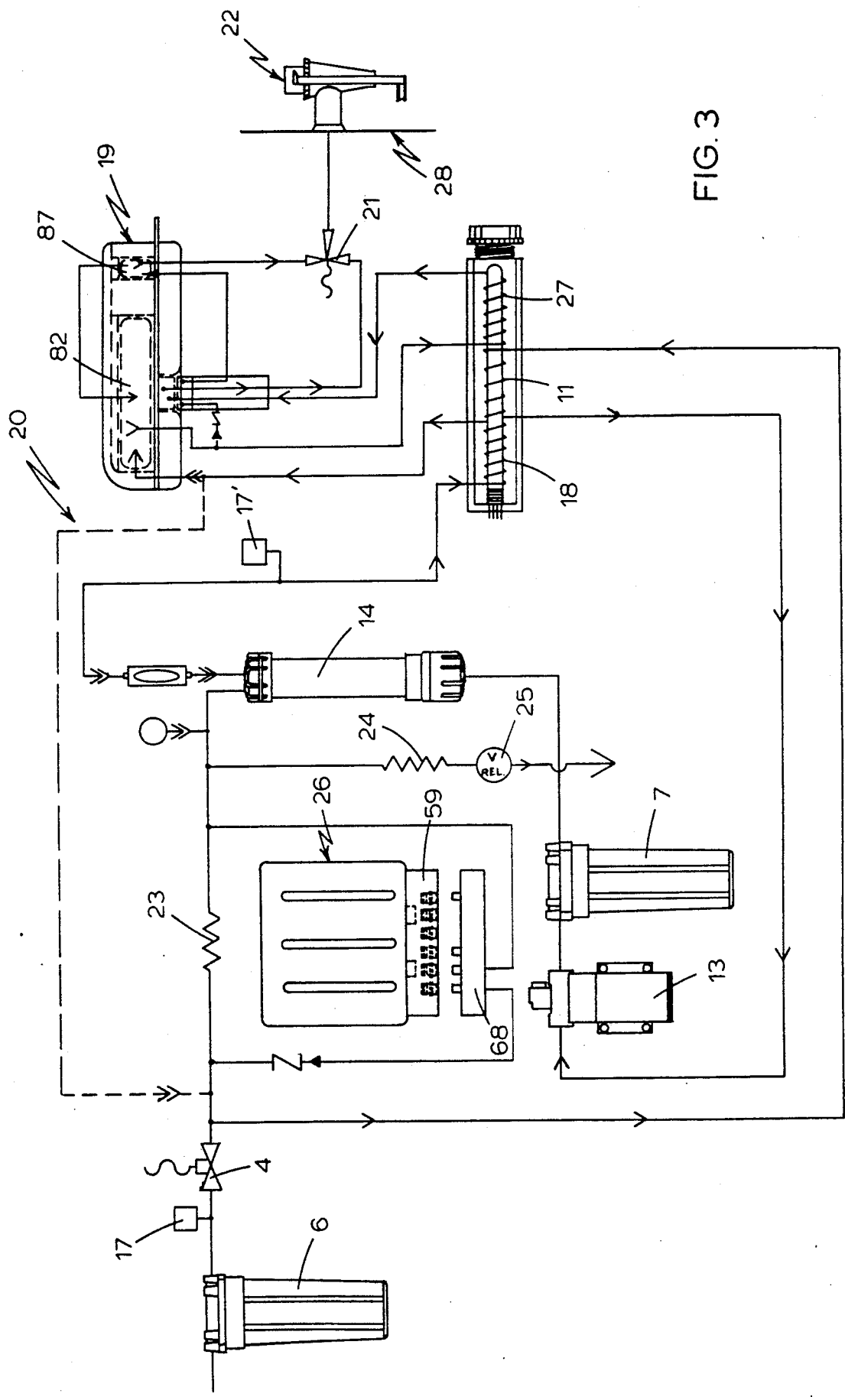
FIG. 3 is a schematic flow diagram of the conduit circuitry between the several parts of a modified embodiment of the inventive liquid purifying apparatus also disclosing the several parts incorporated into a modified purifying apparatus which includes a modified ultra-violet radiation arrangement.
Figure 4:
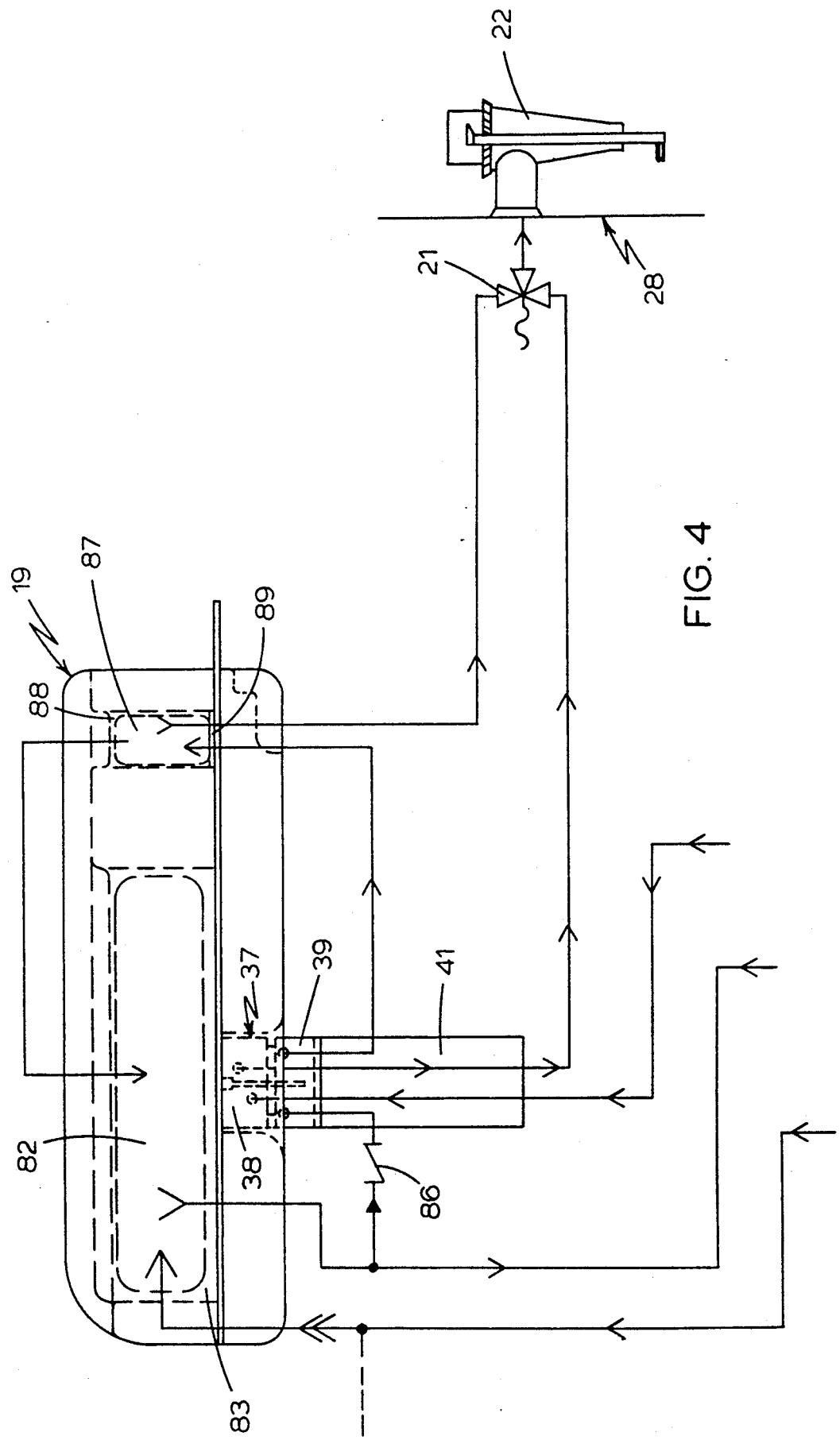
FIG. 4 is an enlarged portion of FIG. 3, disclosing further details of the novel storage receptacle and conduit circuitry included in the flow diagram of FIG. 3.
Figure 7:
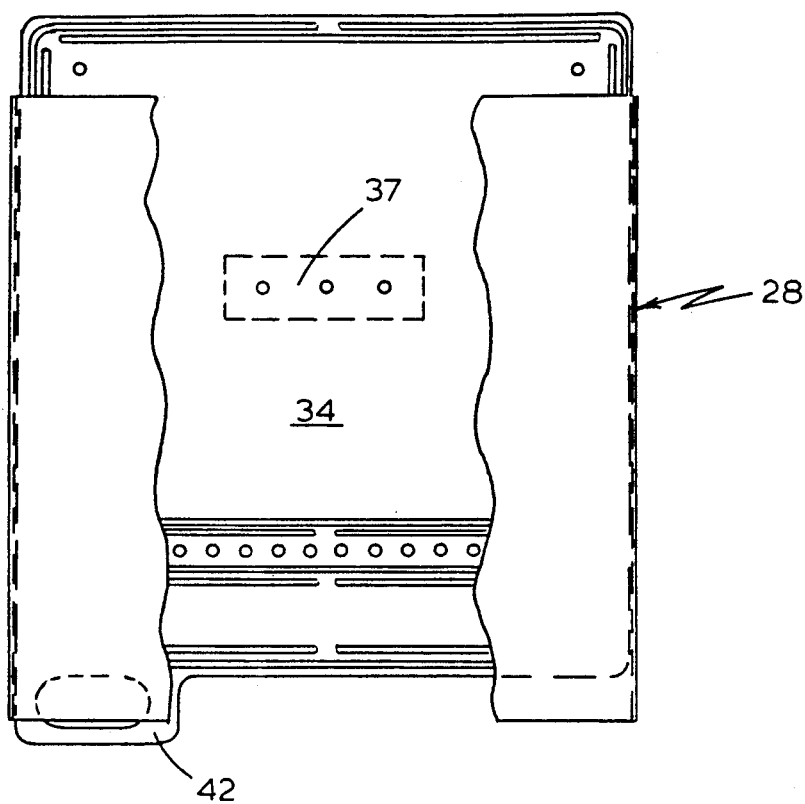
FIG. 7 is a partially broken away top view of the housing assembly of FIGS. 5 and 6 with a portion of the storage receptacle removed in order to disclose the novel plate arrangement included therewith.

Referring to FIG. 3 of the drawings, a modified flow diagram 20 from that of FIG. 1 is shown. In this embodiment of the invention, the housing for the ion filter 7 is positioned downstream pump 13 before the reverse osmosis unit and a third helically-wound section 27 is utilized to surround ultra-violet radiation tube 12. This third ultra-violet radiation section 27 is utilized to apply a third ultra-violet treatment to the fluid after it leaves storage receptacle 19, returns to a thermoelectric element associated with receptacle 19 and passes to user tap 22. The flow of fluid through the separate compartments of the compartmentalized storage receptacle 19 for the embodiment of FIGS. 3 and 4 is also described hereinafter. Other than for the principal changes of position of the ion filter 7, the relocation of a conductivity meter, the elimination of a few minor valves, and the additional ultra-violet treatment section 27 surrounding tube 12, the novel parts involved in the flow diagram 20 of FIG. 3 can be substantially like those in the flow diagram 2 of FIG. 1 and accordingly bear like reference numerals.

Figure 5:
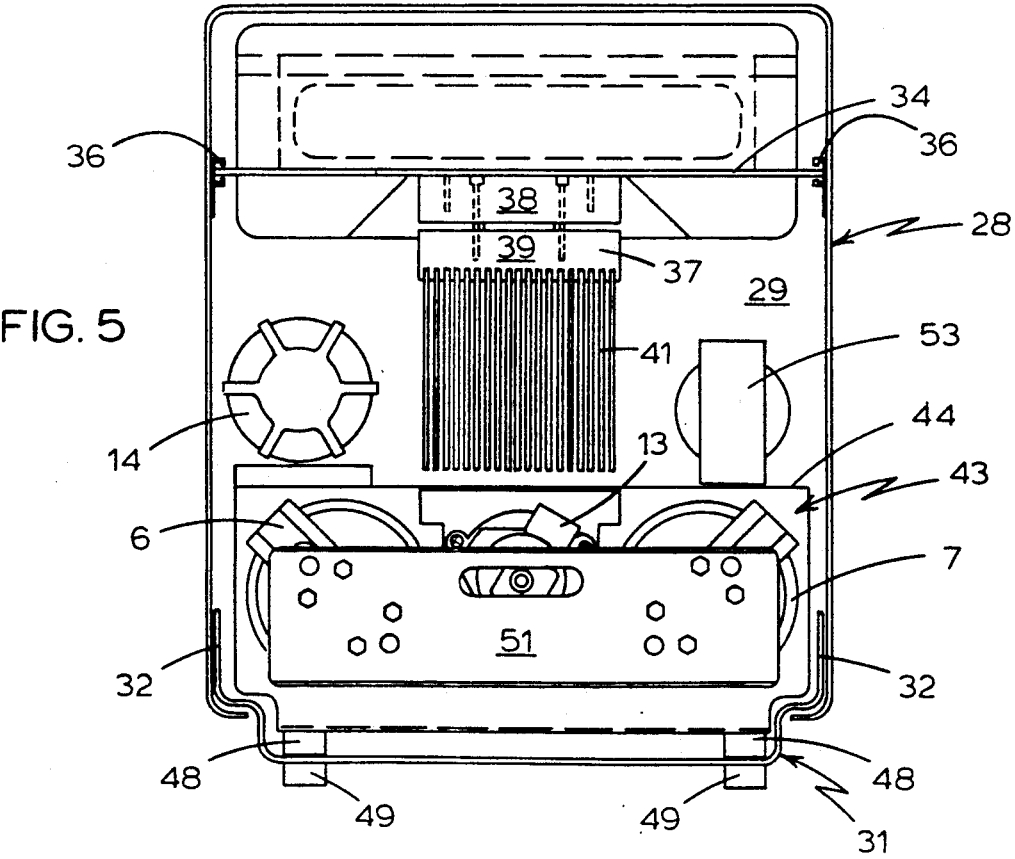
FIG. 5 is a schematic front end, partially broken away view of the novel housing arrangement of the present invention showing the unique spacing between housing and drain receptacle side walls with the disinfection/rejuvenation container removed in order to show a portion of the novel frame assembly for supporting the filters and pump as a unit in the lower portion of the housing, the novel storage receptacle in the upper portion of the housing with the thermal heat transfer and heat exchanger arrangement suspended therefrom and the spaced reverse osmosis container and power supply unit disposed on either side of the heat exchanger.
Figure 6:
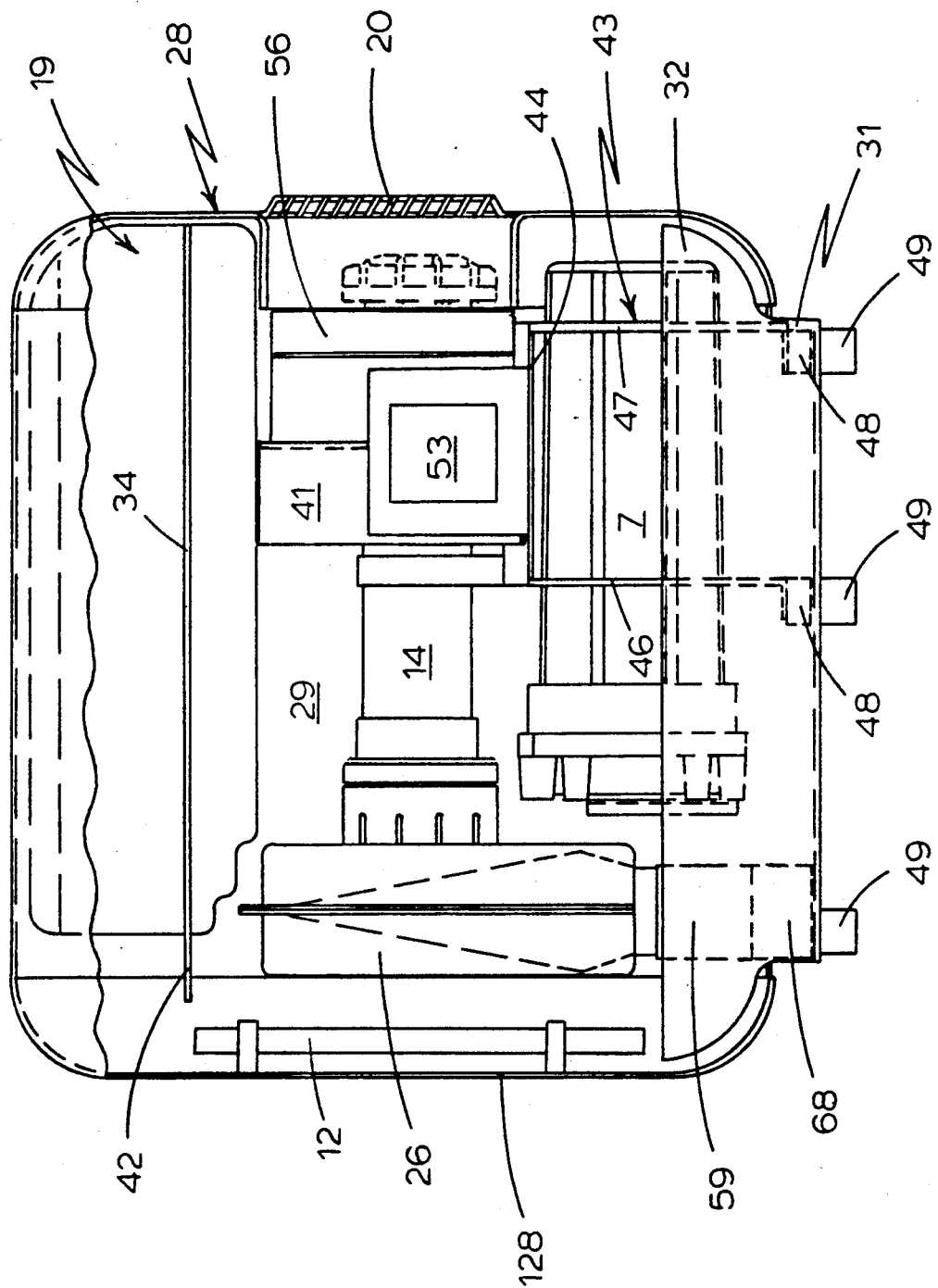
FIG. 6 is a schematic side view of the novel housing arrangement of FIG. 5 disclosing the front and rear end cover and disinfection/rejuvenation unit ordinarily only present during a treatment cycle, which parts were not included in FIG. 5 for the purposes of illustration and further disclosing the blower and ambient inlet associated therewith which is utilized to move an air stream over the heat exchanger and other parts of the housing to be exhausted downwardly through the passage between the spaced housing and drain receptacle.
Figure 9:
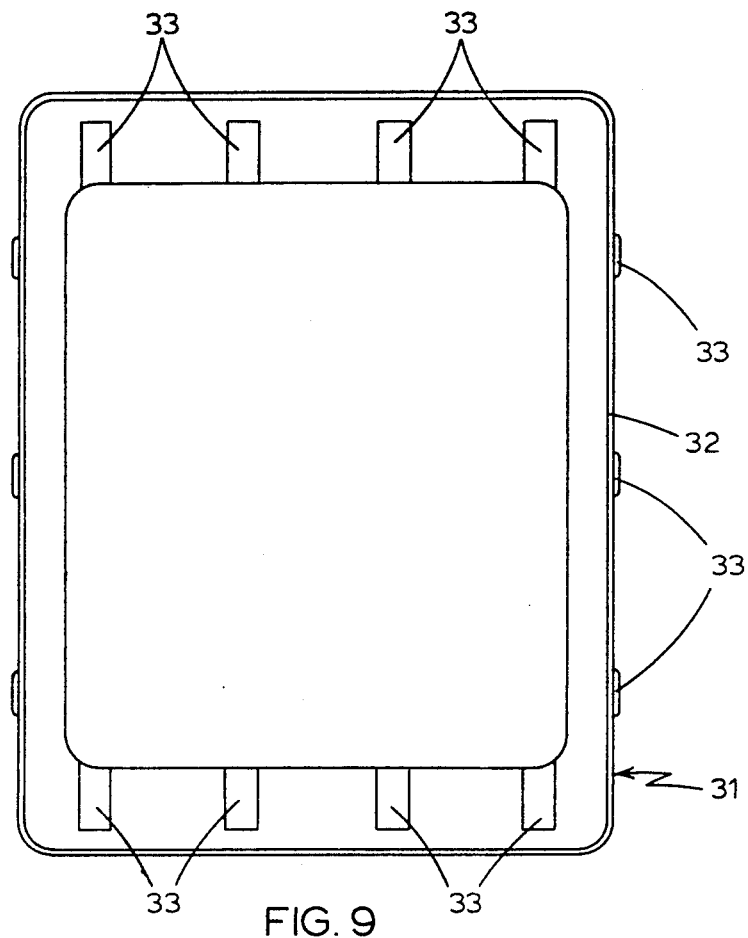
FIG. 9 is a top view of the drain receptacle of FIG. 8.
Figure 10:
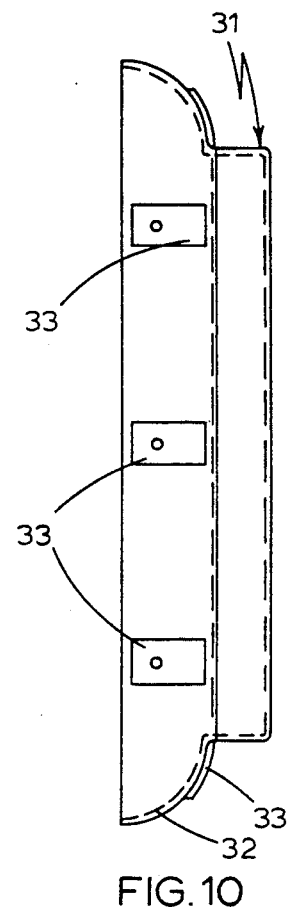
FIG. 10 is a side view of the drain receptacle of FIGS. 8 and 9.
Figure 8:
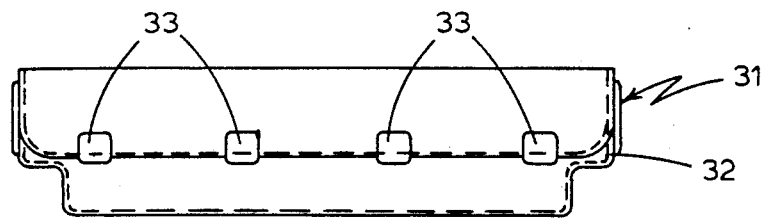
FIG. 8 is a front view of the drain receptacle disclosed in FIGS. 5-7.
Figure 11:
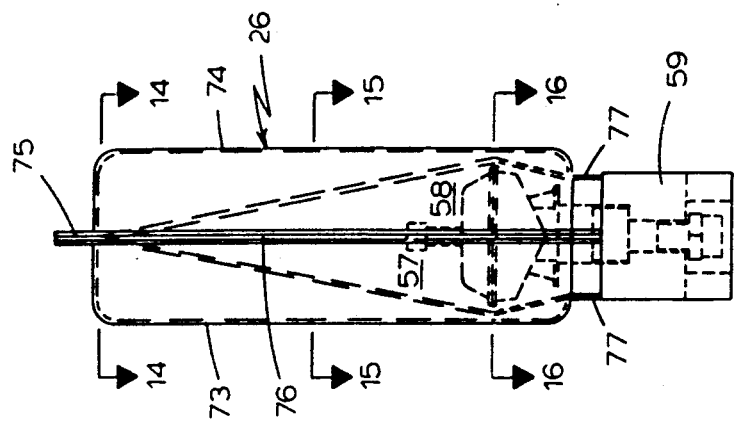
FIG. 11 is an enlarged partially broken away end view of the novel disinfection/rejuvenation container disclosed in FIGS. 1 and 3 of the drawings.

Referring to FIGS. 5 through 10 of the drawings, the inventive housing arrangement for the compact liquid purification system is disclosed as including a walled housing 28, which in the embodiment disclosed advantageously is of rectangular configuration but which can vary in shape in accordance with specific needs. Housing 28 serves to provide a main plenum 29 and is preselectively sized to contain liquid purification system 2 therein communicatively extending between inlet 3 which is connected to a water source, to the outlet, which is connected to user tap 22. The housing 28 can be formed from any suitably insulated metallic or plastic material and advantageously is formed from a thin but sturdy, light-weight aluminum. Positioned below plenum 29 to receive liquid condensates from the liquid purification system 2, which is disposed within plenum 29, is drain receptacle 31. Drain receptacle 31, which serves to allow evaporation of liquids received thereby, includes vertically extending side wall member 32 which extend normally from the lower peripheral edge thereof. As can be seen in FIGS. 5 and 6 of the drawings, the bottom peripheral edge portion of walled housing 28 can be inwardly curved to overlap in spaced relation with the outwardly curved upper edge portion of peripheral side walls 32 of drain receptacle 31. It is to be understood that any one of a number of spacer elements can be utilized to provide the spacing between the inwardly curved lower peripheral edge portions of housing 28 and the outwardly curved upper peripheral edge portions of drain receptacle side walls 32 so as to provide an elongated, air flow dispersing sound baffling passage therebetween. Advantageously, and as can be seen in FIGS. 8–10, the spacer elements can be an integral part of the peripheral side walls 32 of drain receptacle 31 in the form of selectively spaced outwardly extending protuberances 33 abutting and fastened by a suitable fastening device to the otherwise spaced inner face of the curved lower peripheral edge portion of wall housing 28. It, of course, is to be understood that these protrusions 33 could also be formed on the inner face of the inwardly curved edge of walled housing 28 to abut the outer face of peripheral side wall 32.

Again referring to FIGS. 5–7 of the drawings, it can be seen that the upper portion of plenum 29 serves to slidably receive the side edges of a hereinafter described plate member 34 of liquid storage receptacle 19 which form a part of liquid purification system 2. Suitably opposed, mirror-image, longitudinally extending slotted track members 36 of U-shaped cross-section have longitudinally extending bases appropriately mounted in fastened relation to the opposed inner faces of walled housing 28 to receive and support the opposed edges of plate member 34 between the spaced longitudinally extending side portions, as can be particularly seen in FIG. 5 of the drawings. As also can be seen in FIG. 5, plate member 34 serves to support from the lower face thereof intermediate opposed track members 36, a thermoelectric module 37 which includes a cold side 38 and a hot side 39. The hot side 39, in turn, has the heat exchanger or heat sink element 41 suspended therefrom in the form of spaced thermally conductive fin-like plate members. As can be particularly seen in FIG. 7 of the drawings, plate member 34 can be provided with a slotted gripping handle 42 on the front edge thereof to allow manual slidable movement of the entire storage receptacle assembly 19 on the opposed tracks 36.

Figure 17:
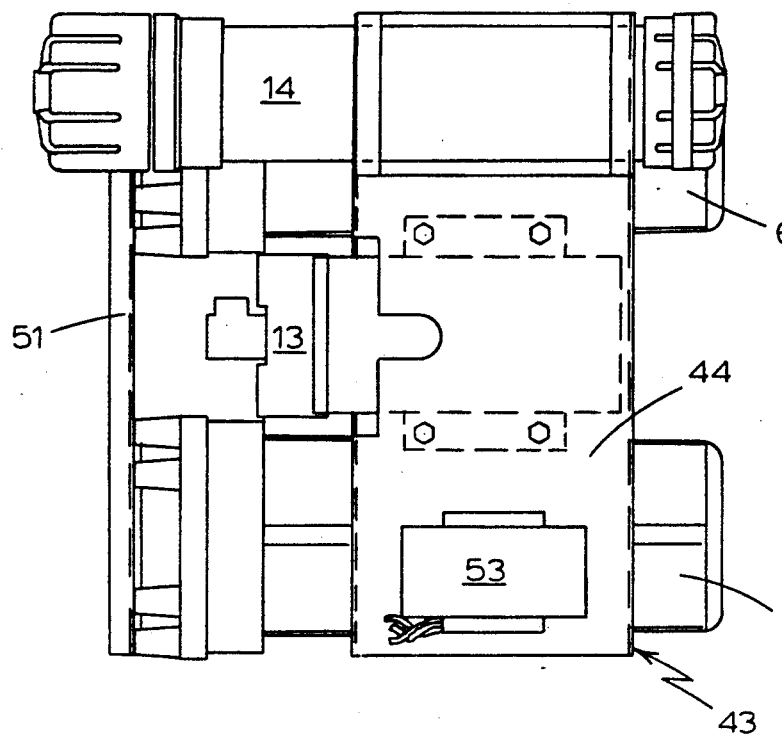
FIG. 17 is a top plan view of the novel frame arrangement for mounting the reverse osmosis unit and spaced power pack unit in a stacked upper tier of a frame and the two filter containers and pump therebetween in the lower tier of the frame of FIGS. 5-7 of the drawings, all as an isolated unit within the housing to balance and absorb pump vibrations.
Figure 18:
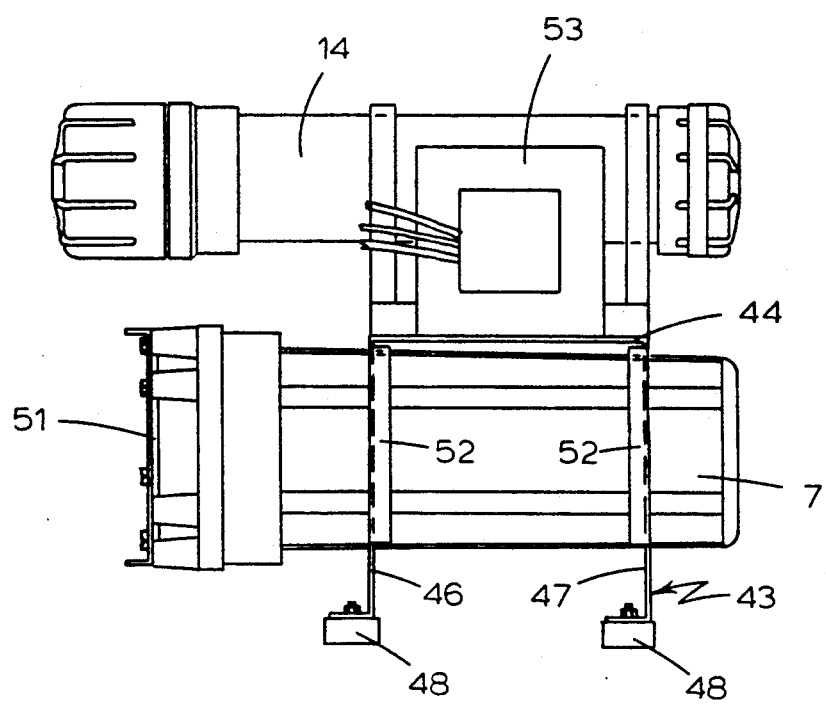
FIG. 18 is a side view of the isolating frame unit of FIG. 17.

Again referring to FIG. 5 of the drawings and also to FIG. 6 of the drawings, as well as to later FIGS. 17 and 18, it can be seen that the prefilter housing unit 6, diaphragm pump 13 and ion adding filter unit 7 are mounted in spaced longitudinally extending position to extend in spaced relation from the front wall of housing 28 toward the rear wall thereof by means of a unitary support from 43. Referring particularly to FIGS. 5 and 6, it can be seen that frame member 43, which can be formed from a unitary piece of sturdy sheet metal, such as aluminum or stainless steel, is appropriately sized to extend longitudinally between and spaced from the side walls of housing 28. The longitudinal cross-section of frame member 43 is of inverted U-shape to provide a base panel 44 and two spaced side panels 46 and 47. When properly inserted in the lower portion of plenum 29, base panel 44 extends in a horizontal plane and the spaced front and rear side panels or legs 46 and 47 respectively extend downwardly with the corner extremity of each side panel having a footing 48 which rests on the upper face of drain receptacle 31. It is to be noted that the lower face portion of drain receptacle 31 also is provided with similar footings 49 at the corners thereof so that the entire housing 28, including drain receptacle 31 and independently resting frame member 43 disposed thereon can rest on a flat support surface, such as a table top. The parallel front and rear side panels 46 and 47 respectively are provided with spaced, aligned apertures which are appropriately sized to receive therethrough in snug nestingly wedge-like engagement therewith in a lower tier the inwardly tapered filter housings 6 and 7. As can be seen clearly in FIGS. 5, 17 and 18, the front ends of spaced parallel, tapered filter housings 6 and 7 are connected by a slotted connecting panel member 51 to allow ready removal of both tapered housings 6 and 7 from frame member 43. It is to be noted that suitable gaskets 52 which can be of plastic, are provided around the peripheries of the aligned apertures to insure firm wedging of the tapered filter housings 6 and 7 therein. As can be seen in FIGS. 5 and 18 of the drawings, suspended in the lower tier from the underside of horizontal base panel in spaced relation between frame supported filter housings 6 and 7 is diaphragm pump 13 and mounted in an upper tier on the upper face of horizontal base panel 44 in spaced relation from either side of the heat exchange fins 41 is the reverse osmosis unit 14 and a power pack 53. This power pack 53 which includes an appropriate transformer and voltage regulator serves to provide a selected level of electrical energy (12 volts) to several parts of liquid purification system 2 requiring such energy and which are disposed in plenum 29, including but not limited to the thermoelectric module 37 and blower 56 (FIG. 6) which moves ambient air from inlet 20 in walled housing 28 over heat exchange fins 41 to which the blower is attached and downwardly through the aforedescribed outlet passage defined between the spaced walls of walled housing 28 and drain pan 31. The ultra-violet radiation tube 12, the pump 13 and the heater plate 54 in storage receptacle 19 (as described hereinafter) can be supplied with electrical energy from a direct separate appropriate energy source, such as a 220 volt source.

Figure 27:
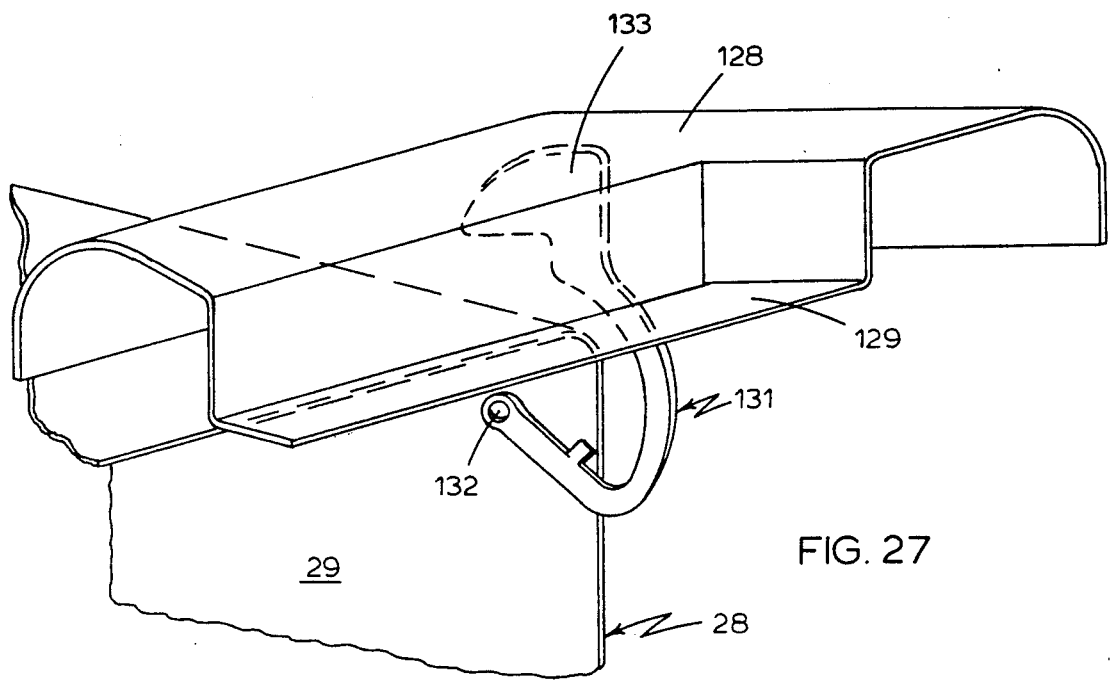
FIG. 27 is an enlarged partially broken away, schematic and isometric, side view of an upper corner of the novel housing arrangement taken in a plane through line 27—27 of FIG. 26 disclosing a portion of the top cover in open position with a top edge hinge arrangement therefor and further disclosing a portion of the recess in the cover for nestingly accommodating a user tap.

Referring to FIGS. 6 and 27 of the drawings which discloses a portion of the front cover for walled housing 28, it can be seen that ultra-violet tube 12 can be vertically positioned on the inside face of the front cover adjacent the novel treatment container arrangement 26, tube 12 further serving to light the front panel, a portion of which can be in the form of a transparent polycarbonate window to block ultra-violet radiation from tube 12. In this regard, it is to be noted that tube 12 and the conduit sections therearound can, in turn, be surrounded with a radiation absorption and reflective shield (not shown) which, advantageously, can be in the form of a suitable number of layers of aluminized coated sheets of Mylar material which serve to absorb the emitted radiation from tube 12 and to reflect portion thereof back to the surrounding coil sections. It is to be understood that, for the purposes of clarity of understanding, details of the electrical and fluid circuitry are not disclosed in FIGS. 5–28 of the drawings since it is considered that the schematic flow diagrams of FIGS. 1–4 suffice for this purpose.

Figure 12:
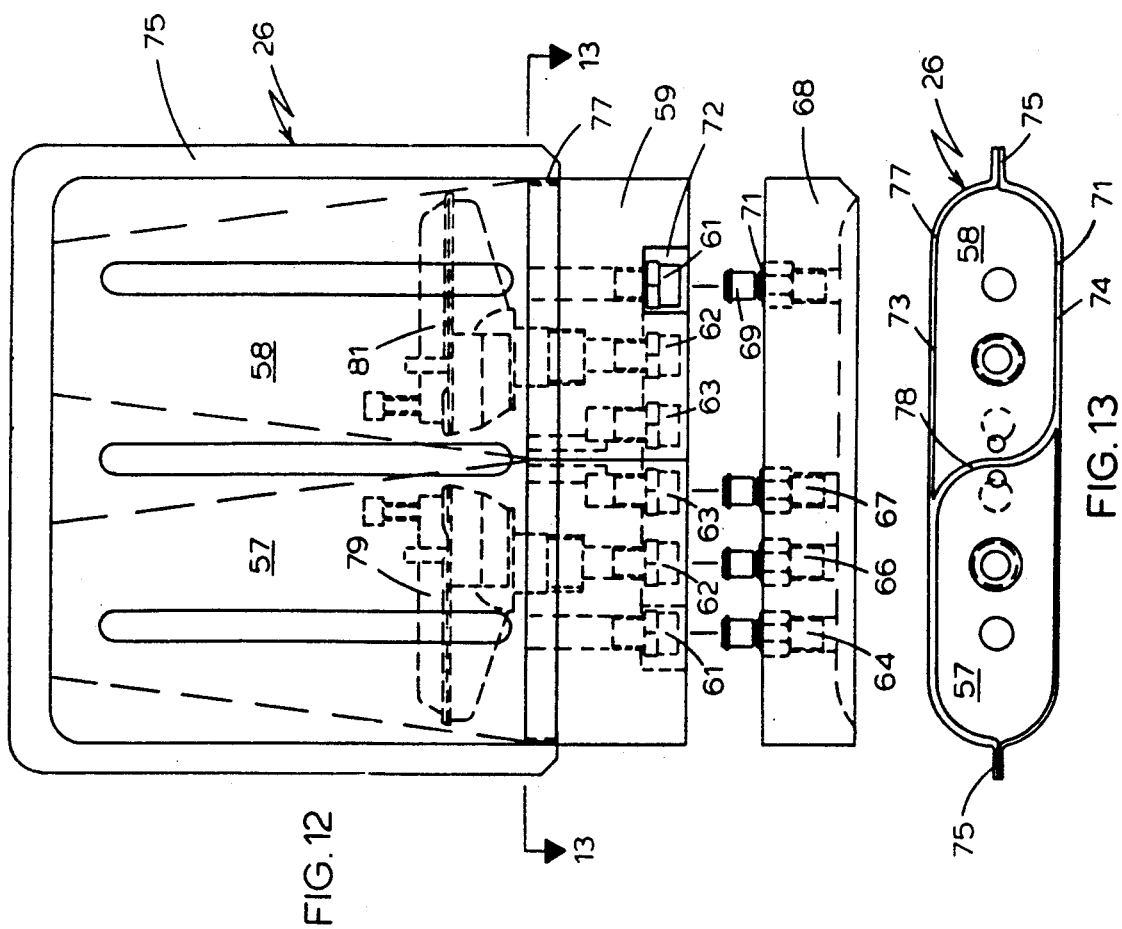
FIG. 12 is an exploded side view of the container of FIG. 11, further illustrating the header and header connections associated therewith.
Figure 13:
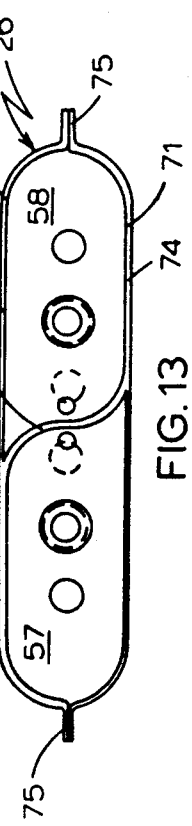
FIG. 13 is a cross-sectional view of the container of FIGS. 11 and 12 taken in a plane through line 13—13 of FIG. 12.
Figure 14:
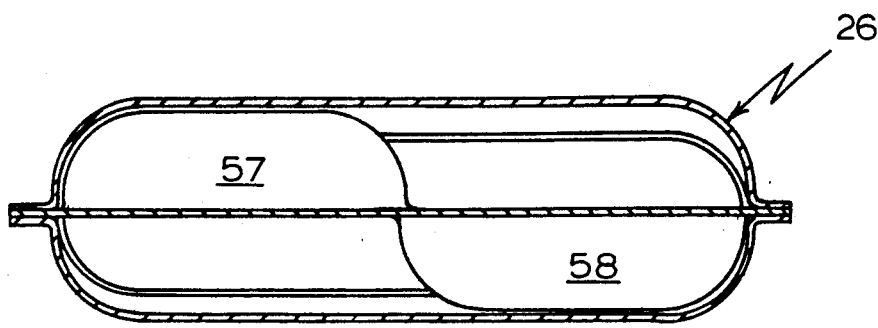
FIGS. 14 through 16 are three separate cross-sectional views taken in spaced planes through lines 14—14, 15—15 and 16—16 respectively of the container of FIG. 11 to illustrate stages of the longitudinally tapering configuration of the disinfection/rejuvenation container and the changing form of the wave-like divider providing two mirror-image compartments within the container.
Figure 15:
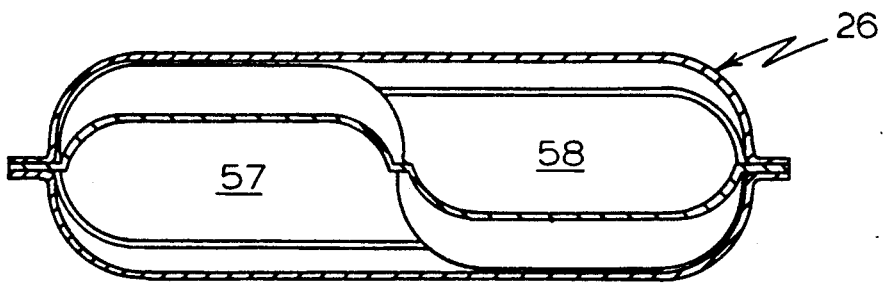
Figure 16:
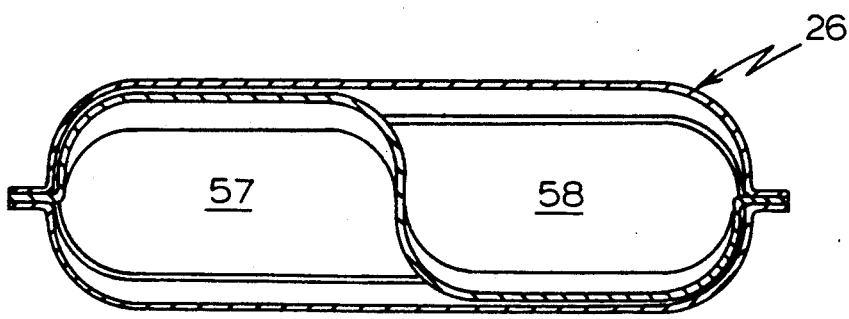

Referring to FIGS. 12–16 of the drawings, details of the novel disinfection/rejuvenation treatment container 26 which can be utilized in the reverse osmosis "loop circuit" 15 (FIGS. 1 and 3) are disclosed. This treatment container 26 can be unitary in form and is fluid impervious to provide two fluid impervious compartments 57 and 58 for introduction of disinfection and rejuvenation fluids respectively for treatment of the reverse osmosis unit 14. In the instance of water purification, appropriately selected acid and base fluids are respectively provided, one of the two fluids being stored in each compartment. A compartment header block 59 is mounted in sealed relation at corresponding fluid communication ends for each of the compartments 57 and 58, this unitary header block 59 serving to provide a header pair, one for each compartment 57 and 58. Although it would be possible to use separate headers, in the embodiment disclosed in FIG. 12 of the drawings, the header for each compartment, or in other words the header pair, is formed from the single unitary header block 59. Each compartment header of the header pair in unitary header block 59 is provided with a spaced set of three mating port connections 61, 62, 63 which are embedded in unitary header block 59 in mirror-image relation, as can be seen in FIG. 12. Although not shown in detail, the upper end of each port connection of each set can, when treatment container 26 is properly positioned, communicate with the respective compartments 57, 58 thereabove. The lower end of each port connection is of a female nature and when a respective compartment 57, 58 is in operating position, receive a male nipple of connections 64, 66, 67 embeddedly mounted in the treatment header block 68. In effect, the lower female ends of connections 61, 62 and 63 of a connection set for a compartment connect respectively with the nipples of connections 64, 66, 67 in a connecting arrangement of 61–64, 62–66 and 63–67. The connected arrangements 61–64, 62–66 and 63–67 can serve as treatment fluid outlet, treatment fluid inlet and air inlet/outlet for each compartment 57 and 58 when the particular connection set for one of the two compartments 57 and 58 is placed in connected or engaged operation position with the respective male nipples 64, 66, 67 of treatment header block 68 of the fluid system 2. Although not shown in detail, as can be seen in FIG. 6 of the drawings, treatment header block 68 to which compartment header block 59 is connected, can be positioned in drain receptacle 31 In this regard, it is to be noted that a tie-down connection in the form of a nipple 69 is provided in treatment header block 68. This tie-down connection 69 serves to engage with the female portion of connection 61 of that set of mirror-image connections 61, 62, 63 of a compartment 57 or 58 which is not in operating position. A suitable spring loaded latch 71, such as a quick disconnect latch sold by Colder Products of Minneapolis, Minnesota, cooperatively associated with tie-down nipple or connection 69, serves to yieldingly hold the tie-down connection 69 in engagement with the female portion of connection 61 of that mirror-image set of connections not in operating position. Thus, from the above description, it can be seen that by merely rotating compartment header block 59 through one hundred eighty degrees (180°), one of the two disinfection/rejuvenation compartments 57 and 58 can be connected to the treatment header block 68 which comprises part of liquid purification system 2, with the other compartment not operatively connected being appropriately anchored on nipple 69 by spring loaded latch 71. To readily release quick disconnect latch 71 an appropriate manual access recess 72 can be provided adjacent female connection 61 on either side of compartment header block 59.

In accordance with another feature of the present invention the fluid impervious disinfection/rejuvenation compartments 57 and 58 can be formed from three vacuum molded thin, light rigid panels formed from a suitable fluid impervious material, such as an appropriate polycarbonate compound, which material also can be used to form the compartment header manifold 59 and the treatment header block 68 above described. Two of the three panels forming fluid impervious compartments 57 and 58, namely outside panels 73 and 74 are identically sized and flanged along three edges—namely, the two opposed side edges and the base edge from which the side edges extend. These three flange edges of the two outside panels 73 and 74 are positioned in mirror-image facing relation to initially provide a chamber of longitudinally extending rectangular configuration form to include an open mouth header inlet end adjacent and fastened to the header block 59, which provides, as a unit, the aforedescribed compartment headers for each compartment 57 and 58. Opposed to the open-mouth header end, the bases of the flanged opposed panels provide the closed end of the compartments 57 and 58. A third panel 76 interposed between mirror-image edge flanged panels 73 and 74 serves as a divider wall therebetween to provide fluid impervious compartments 57 and 58. Panel 76 can be in the form of a longitudinally-extending wave-shaped sheet to extend longitudinally between the mirror-image positioned first and second outside panels 73 and 74 from the open-mouth header inlet end to the opposed closed end and from diametrically-opposed corners of the longitudinally-extending chamber of rectangular configuration formed by outside panels 73 and 74 with the longitudinally-extending opposed side and base edges of all three panels—namely outside panels 73 and 74 and divider panel 76 having a common seam 75 which extends along the opposed side and base edges thereof to provide the pair of compartments 57 and 58 in mirror-image nesting relation. These compartments 57 and 58 are geometrically of triangular-like cross-sectional configuration to extend from the header ends to the closed end. Since the panels and header can be formed from a similar molded plastic material the common seam along the opposed side and base edges of the panels can be formed by fusing, as can the seam between the open-mouth compartments and the header block 59. In this regard, it is to be noted that header block 59 is provided with a suitably recessed surrounding peripheral edge 77 and a wave-like recess 78 extending centrally between the opposed sides of the peripheral recessed edge 77 to overlappingly receive and respectively nest with the joined header edges of the three panels 73, 74 and 76. It further is to be noted that connected to each inlet connection 62 and disposed within compartments 57 and 58 are pressure sensing valves 79 and 81 which are utilized within each compartment to regulate flow during the treatment cycle, to determine compartment fill and, in an emergency, to shut off fluid flow to the compartment at a preselected volume level.

It is to be understood that the aforedescribed novel arrangement can be employed to provide disinfection/rejuvenation units of different geometric configurations and possibly even of a different number of compartments, utilizing the unique method of assembly of opposed mirror-image panels with intermediate divider panels, the opposed side and base edges being joined by a common seam to minimize fusing problems which would otherwise arise.

Referring to FIGS. 2, 4 and FIGS. 19-25 of the drawings, details of the fluid storage receptacle 19 and associated accessories utilized therewith can be seen. In describing the fluid flow through the separate bays 82 and 87 in compartments 83 and 88 respectively of the storage receptacle 19 of the invention as is set forth in FIGS. 2 and 4 of the drawings, purified fluid passing from the helically-wound section 18 surrounding ultra-violet radiation tube 12 enters into the separate expansible cold fluid storage bag member 82 occupying the cold storage compartment 83 of storage receptacle 19. When the cold storage bag member 82 reaches a predetermined level, it actuates a novel, magnetically-controlled switch, described hereinafter, to cause fluid flow to the cold bag member 82 to cease. When cold fluid is removed from the cold storage bag member 82 to flow through control valve 21 to user tap 22 after a certain lag period or hysteresis lag in the magnetization of the switch, flow to the cold bag member 82 again commences. If control valve 21 is closed to user tap 22, the level in cold bag member 82 rises. When the head pressure reaches a preselected point in cold bag member 82, a novel by-pass check valve 86, also described hereinafter, opens to allow some of the fluid directed to cold bag member 82 to pass through the hot side 39 of the thermoelectric module 37 for heating prior to entry into hot storage bag member 87 located in hot storage compartment 88 of storage receptacle 19. It is to be noted, in this regard, that the cold side 38 of thermoelectric module 37 is positioned adjacent cold storage compartment 83 so as to cool the fluid introduced into cold storage bag member 82. Advantageously cold storage bag member 82 and hot storage bag member 87 can be formed from sheets of a thin, thermally-conductive material, such as Mylar. In storage receptacle 19, the hot storage compartment 88 is provided in the floor thereof with a suitable foil strip heater 89 such as one sold by Minco of Minneapolis, Minnesota. Advantageously, this foil strip heater 89 can be wrapped or otherwise protected with an insulating material such as a closed cell silicone foam which insulator serves to modulate the temperature to fall within a range of approximately 250° F. to 300° F. A suitable over temperature regulator (not shown) can be provided to interrupt a 220 volt energy supply to the foil heater from the same supply source supplying energy to ultra-violet radiation tube 12. A portion of the heated fluid in hot storage bag member 87 is caused to vaporize by the temperatures imparted thereto, thus reducing bacterial contaminants with the thus vaporized and bacterial treated vapors flowing over from hot storage bag 87 to cold storage bag 82. These vapors condense in cold storage bag 82 with the fluid level rising in the bag and the aforedescribed cycle of fluid flow is repeated. If it is desired to obtain hot fluid at user tap 22, it is only necessary to adjust three port or three-way valve accordingly, shutting off cold fluid flow from cold storage bag 82 thereto and turning on hot fluid flow from hot storage bag 87.

In FIGS. 3 and 4 of the drawings, the path of fluid flow is, in many respects, similar to that aforedescribed. However, in these drawings, the cold fluid from cold storage bag 82 is passed to helical coil section 27, also surrounding ultra-violet radiation tube 12 for a third ultra-violet radiation treatment. From there, the fluid passes through the cold side 38 of thermoelectric module 37 and then to user tap 22 through flow control 21. As in FIGS. 1 and 2, appropriate control valving such as at 21 can be employed to allow alternative hot and cold fluid flow to user tap 22 and, if desired and as shown, appropriate heating foil and vaporization circuitry between bags 82 and 87 can be utilized.

Figure 19:
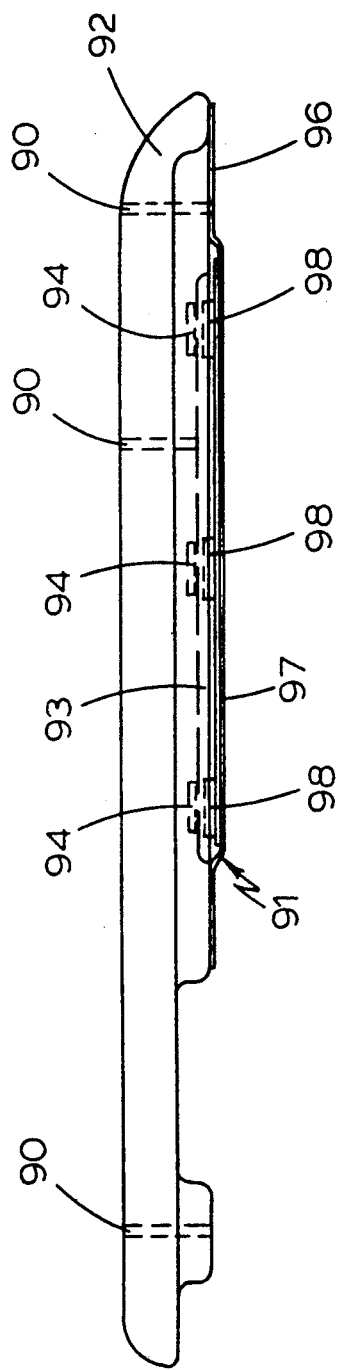
FIG. 19 is a partially broken away exploded view taken from a reverse side of the novel storage receptacle of FIGS. 1, 3, 5 and 6 of the drawings, disclosing schematically the novel planar switch assembly to control storage chamber volume.
Figure 19:
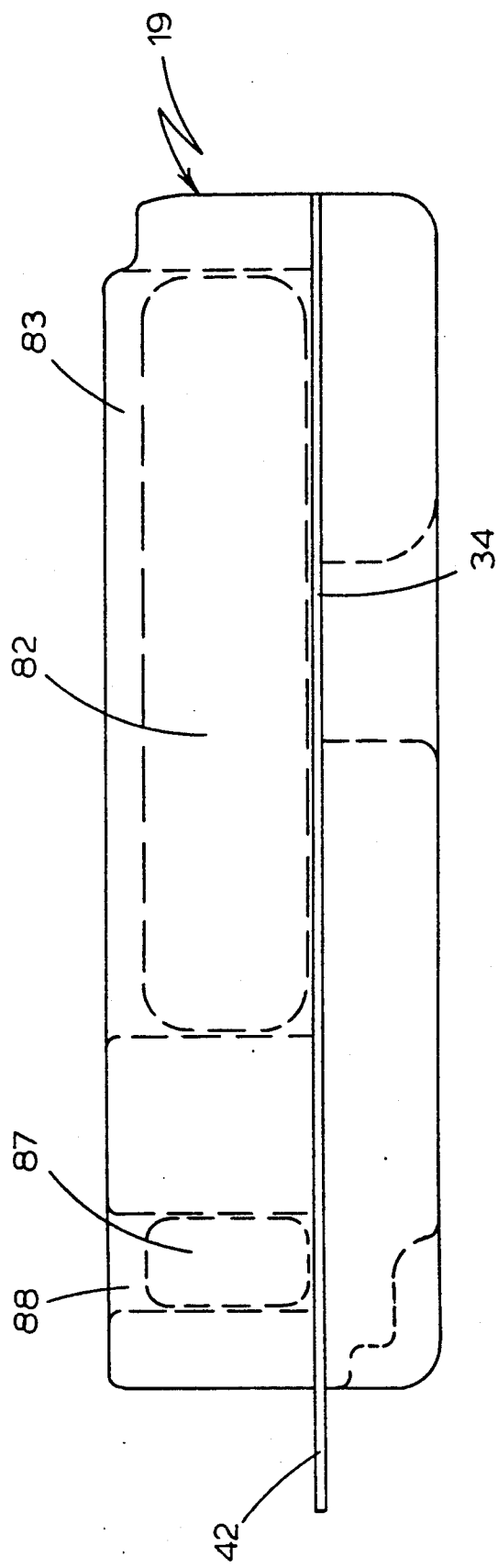
Figure 20:
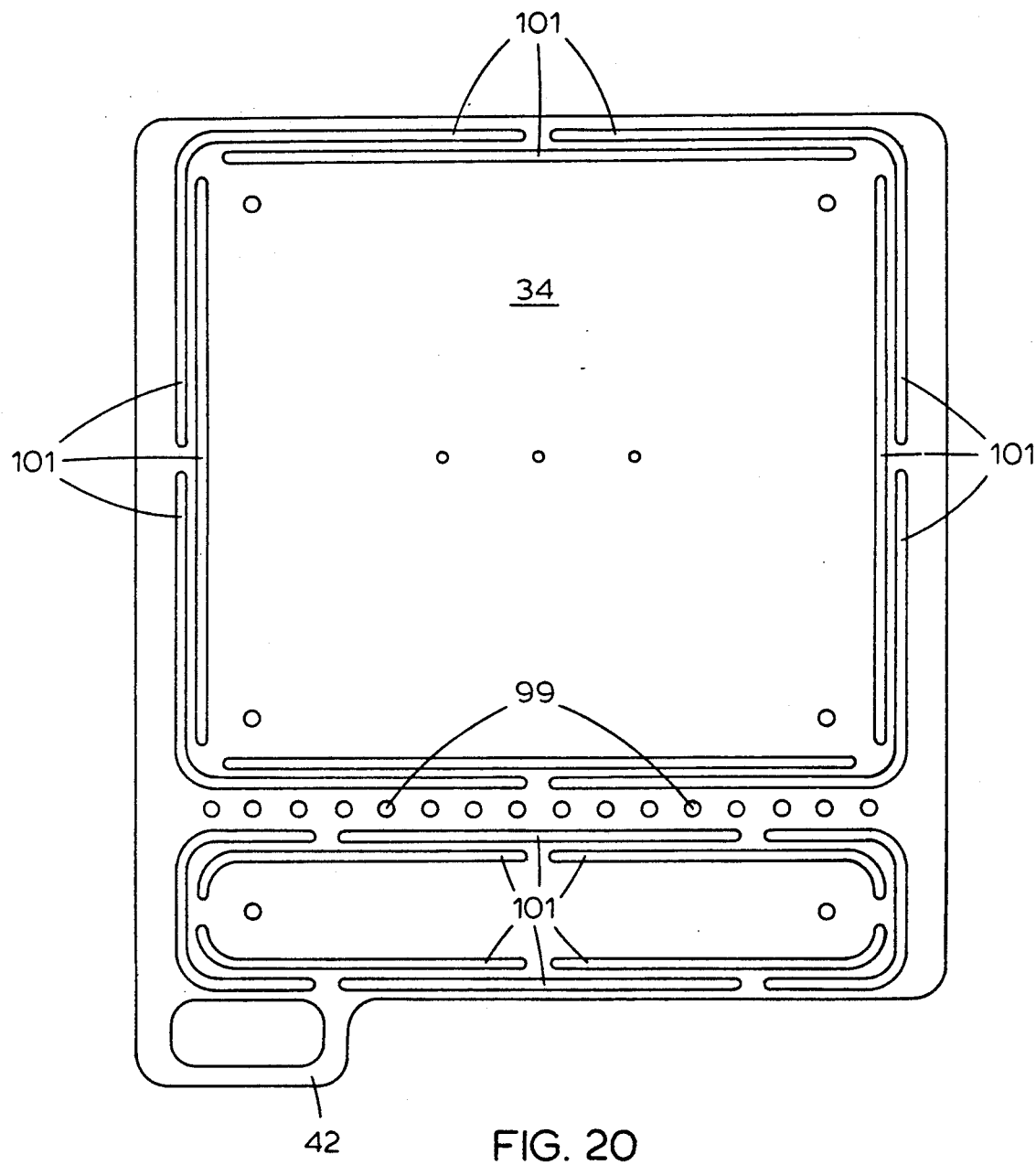
FIG. 20 is a plan view of the novel plate member incorporated as part of the storage receptacle disclosing how this plate member becomes part of a novel molding process.

Referring to FIG. 19 and 20 of the drawings, the novel switch member 91 and aforementioned plate member 34 with slotted gripping handle 42 for storage receptacle 19 are disclosed in more detail. Switch member 91 is disclosed as associated with the cover 92 for storage receptacle 19. Cover 92, like storage receptacle 19 of which it is a part and accordingly-sized and shaped to engage the lower portion thereof, can be formed from a suitable, insulated foam polyurethane material in a manner comparable to the novel method disclosed in FIG. 28 and described hereinafter. Cover member 92 is formed with a lower recess 93 in which three magnetically-actuable contact switches 94 are embedded in a common horizontal plane at approximately 120° to each other in a common circle, these switches being included in parallel in an appropriate electrical circuit (not shown) which controls fluid flow to bag members 82 and 87. A Mylar sheet 96 is fastened to the lower face of cover 92, this sheet being sized to cover recess 93. Supported within recess 93 by sheet 96 is a second sheet 97, which sheet determines a common plane and on which are mounted three magnets 98 which like switches 94 are arranged to fall within a common circle, one hundred and twenty degrees (120°) apart to determine a common plane and to be aligned with contact switches 94. Advantageously, sheet 97 can be of a rigid, polycarbonate material or any other suitable material having low magnetic and thermal conductivity. Accordingly, when any part of storage bag 82 in compartment 83 of storage receptacle 19 reaches a certain preselected level it moves one of magnets 98 supported on sheet 97 toward an aligned contact switch 94 and causes fluid flow to cold and hot storage bags 82 and 87 to be interrupted. It is to be noted that suitable vent lines 90 are provided in cover 92 to allow ambient communication with compartments 83 and 88 and recess 93.

Referring to FIG. 20 of the drawings, details of the novel plate member 34 which is embedded in the lower portion of storage receptacle 19 are disclosed. Plate member 34, which advantageously can be formed from a thin, stiff metallic sheet desirably of preselected thermal conductivity, such as aluminum, extends in a flat plane through the lower portion of polyurethane storage receptacle 19 Plate 34 is provided with selectively-sized and positioned passages therein in the form of spaced lineal aligned flow-through circular holes 99 and spaced lineal-aligned slots 101 which are arranged geometrically to define two rectangular forms which serve to provide the geometric wall limitations for cold and hot storage compartments 83 and 88 above discussed, all in accordance with a novel forming method described hereinafter. In addition, these spaced circular and lineal passages 99 and 101 serve to further define tortuous pathways therebetween to reduce thermal conductivity through the plate from one formed compartment 83 to the other formed compartment 88 with the spacing between holes 99 and slots 101 also allowing for a certain amount of flexibility relative the respective cold and hot storage receptacle walls formed on one face of the plate and between the walls and the bottom of the receptacle formed on the other face of the plate in a manner described hereinafter.

Figure 21:
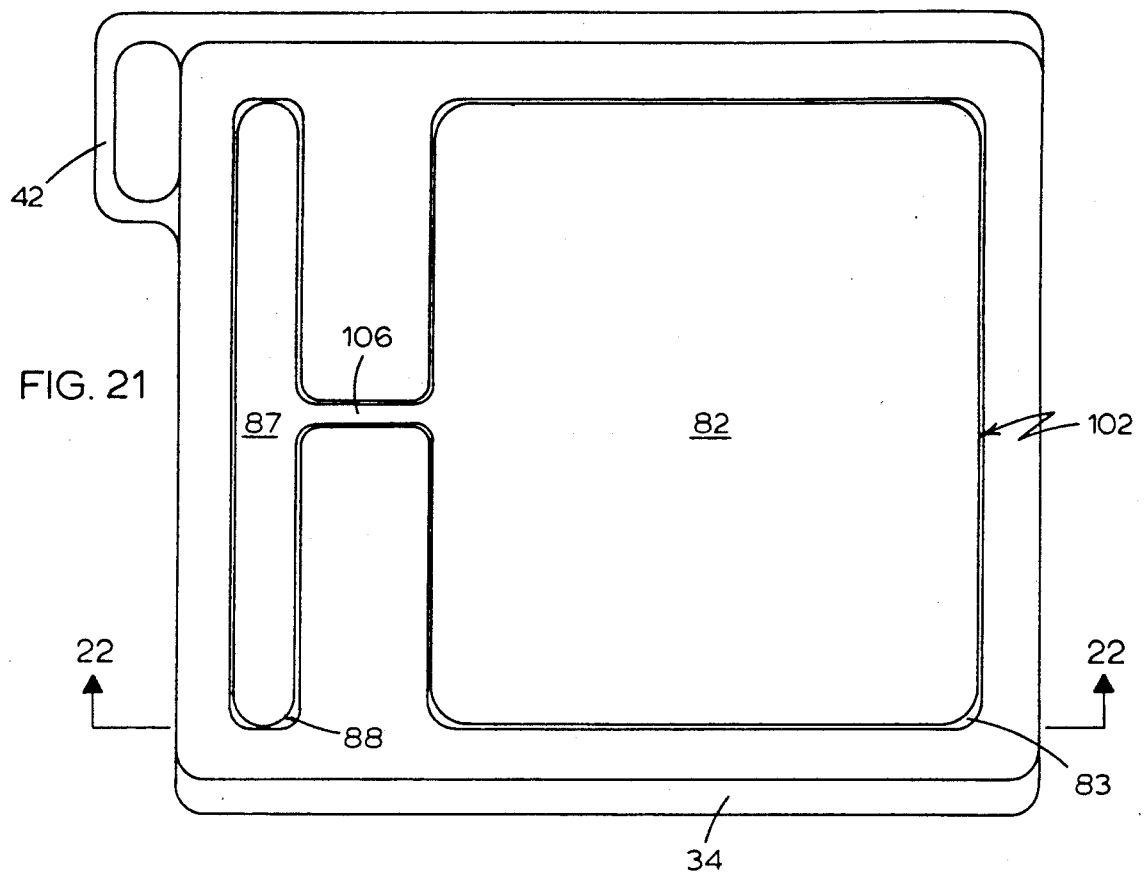
FIG. 21 is a schematic plan view of a modified embodiment of the storage receptacle incorporating a novel unitary bag member assembly, contoured to provide separate communicating cold and hot bag members for the separate compartments of the storage receptacle.
Figure 22:
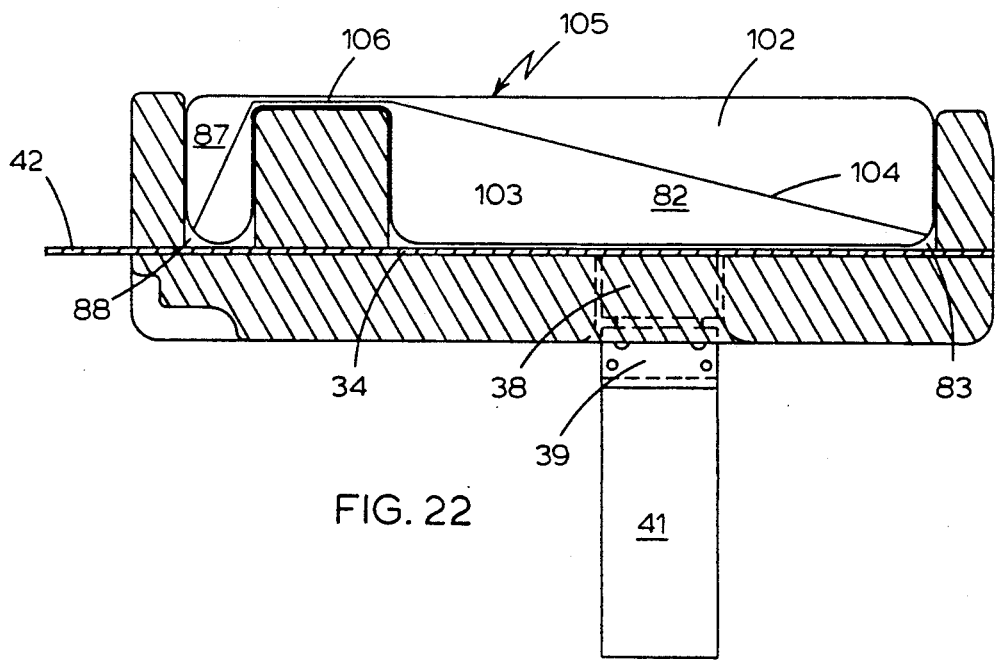
FIG. 22 is a schematic side view of the storage receptacle and sectioned unitary bag member of FIG. 21 further disclosing the thermal electric element and associated heat exchanger fins suspended from the storage receptacle plate.

Referring to FIGS. 21 and 22 of the drawings, a novel modified arrangement for cold storage bag member 82 disposed in cold storage compartment 83 and hot storage bag member 87 disposed in hot storage compartment 88 of storage receptacle 19 is disclosed. In this novel embodiment of the invention, bag members 82 and 87 are shown as part of the same unit bag assembly 105 formed and geometrically-contoured and sized from two appropriately-sized and shaped sheets or plackets 102 and 103 of thin flexible material, such as Mylar, which are cut and fuse-joined in facing mirror-image form along a common seam 104 to provide pockets forming bag members 82 and 87 which are communicatively joined along a cut and shaped common passage 106 extending between the pockets forming bag members 82 and 87.

Figures 23, 24, 25:
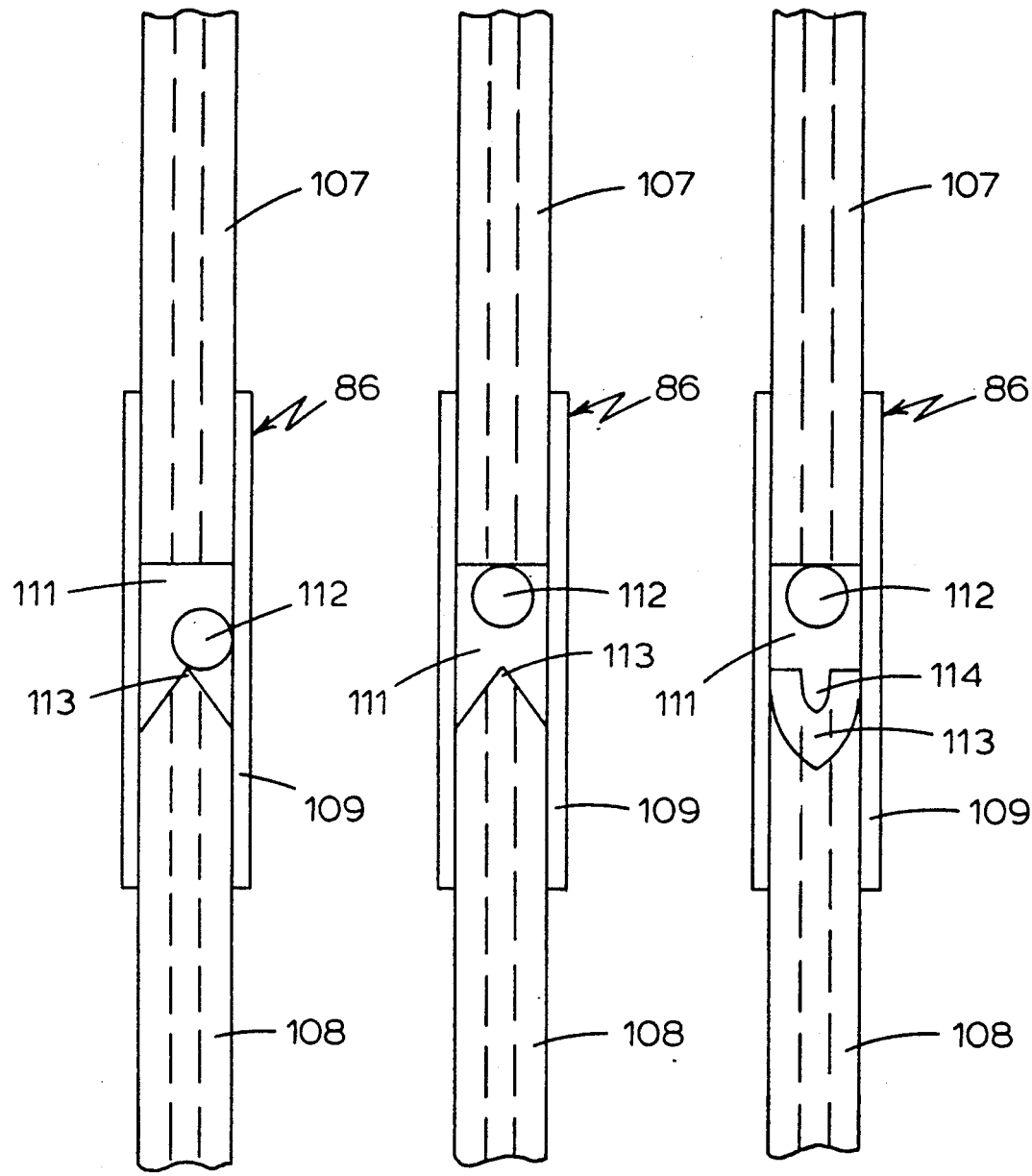
FIGS. 23 and 24 are enlarged front views illustrating two stages of a novel float valve arrangement which can be utilized in conduit circuitry such as schematically disclosed in FIGS. 1-4.
FIG. 25 is an enlarged side view of the float valve stage illustrated in FIG. 24.

Referring to FIGS. 23-26 of the drawings, details are disclosed of a novel by-pass check valve 86 which can be associated with fluid storage receptacle 19 when employed in a liquid purification system such as is set forth in FIGS. 1 and 2 of the drawings. This novel check valve 86 is extremely straightforward and economical in construction, assembly and maintenance yet efficiently accomplishes the purposes for which it is intended. For operational purposes, and referring to FIG. 2 of the drawings, it simply comprises a break and spacing in the vertically-extending portion of silicone by-pass conduit line associated with storage receptacle 19 which line extends between cold storage bag 82 and the hot storage bag 87 passing through the hot side 39 of thermoelectric module 37, as previously described. This break and spacing of the by-pass line is illustrated in FIGS. 23-25 and for purposes of description is referred to as spaced and aligned lines 107 and 108. The ends of lines 107 and 108 are surrounded by a tubing sleeve 109 of appropriate length with an inner diameter which approximates the outer diameter of the by-pass lines 107 and 108. The tubing sleeve 109, which advantageously can also be of silicone material, can be held in fast position by a suitable ambient hardening silicone adhesive paste to define a float chamber 111 between the broken and spaced vertically-extending by-pass line. Positioned within chamber 111 is a float member 112, which, as shown, can be in the form of a ball. Float 112 is of a preselected specific gravity slightly lower than the specific gravity of the liquid to be stored in storage receptacle 19. For example, float 112 can have a specific gravity of 0.91 when the liquid to be stored is water. Float 112 is appropriately-sized to float and cover the inner diameter of line 107 of the vertically-extending by-pass line when the differential pressure between bag members 82 and 87 is at a preselected lower level (FIGS. 24). When the differential pressure between bag members 82 and 87 increases, it forces float 112 downwardly away from the extremity of line 107 to open line 107 to fluid flow, the float being urged by the difference in pressure toward spaced and aligned line 108. In accordance with one feature of the novel invention, the extremity of aligned line 108 spaced and opposed to the extremity of line 107 is so shaped that float 112 can nest but not cover the opening of this extremity. In the embodiment disclosed, the extremity of line 108 can be of triangular apex shape as at 113 with a counter groove 114 centrally disposed at apex 113 sized in breadth to receive float 112 in nesting seated relation therewith but sized in depth to prevent the nesting, seated float 112 from covering the opening of line 108 so as to allow fluid to continue to pass therethrough from opened, aligned and spaced line 107 and the chamber 111.

Figure 26:
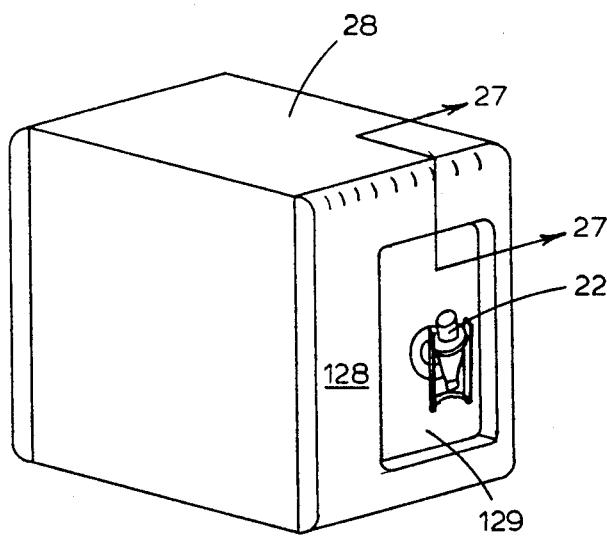
FIG. 26 is a reduced isometric view of the overall housing of FIGS. 5, 6 and 7.

Referring to FIG. 26, housing 28 is disclosed with the front wall thereof, herein referred to as front wall 128, shown as being shaped to include a user tap recess 129 therein to receive the aforedescribed user tap 22 which can be any one of a number of commercially-available spigots, such as the one disclosed and commercially available from Tomlinson Company. This user tap spigot 22 conveniently is designed to receive and support a glass at a location below the spigot spout to pour fluid into the glass by applying a nominal hand pressure on the spigot-supported glass.

As can be seen in FIG. 27 of the drawings, the upper portion of the front wall 128 of housing 28, which front wall extends the height of the housing, is provided with a pair of generally U-shaped over-center pivotal hinges 131. One leg extremity 132 of each hinge 131 (only one being shown) is shown as pivotally-mounted to the side wall of housing 28 with the opposite leg extremity 133 being fastened to the upper portion of the curved side of front wall 128. With this arrangement, it is possible to quickly gain full access to plenum 29 of housing 28 to service any one of the several aforedescribed novel parts of the liquid purification system 2 disposed therein. Advantageously over-center hinges 131 are so designed as to permit the front cover to be pivoted through approximately one hundred and thirty degrees (130°) to a position above the top wall portion of housing 28. However, it is to be understood that the over-center hinges 131 can be designed to allow other pivotal situations, if so desired.

Referring to FIG. 28, mold structure for the unique formation of the lower portion of aforedescribed storage receptacle 19 is disclosed. This structure includes a pair of mating upper and lower mold halves 134 and 136 respectively which are internally contoured to provide the bottom wall of the lower portion of storage receptacle 19 and the peripheral and intermediate side walls extending from the bottom wall to appropriately define the aforedescribed fluid compartments 83 and 88 of storage receptacle 19 which receive the cold and hot storage bags 82 and 87, respectively. To accomplish the unique method for forming storage receptacle 19 the upper and lower mold halves 134 and 136 are closed in mating relation along opposite faces of aforedescribed plate member 34. A suitable plastic material, such as a closed cell foam polyurethane along with an appropriate catalyst is then introduced under pressure from a storage source not shown through lower mold inlet 137. Advantageously, the foam polyurethane selected can have appropriately high heat resisting and insulating qualities which are required for the varying temperatures realized in cold and hot storage compartments 83 and 88 respectively. The foam polyurethane introduced into lower mold half 136 is in sufficient quantity and under sufficient pressure to pass through the holes 99 and lineal slots 101 which are aligned with appropriately-designed recesses to provide the bottom or base wall and the connected or integral peripheral side and intermediate walls of storage receptacle 19 as above described.

It is to be understood that not only is storage receptacle 19 formed by a novel method but, in addition, the method of forming and assembling treatment container 26 (FIGS. 11–16) and the method of forming and assembling the interconnected cold and hot storage bags 82 and 87 (FIG. 21) respectively are novel. In forming treatment container 26, as aforedescribed, a longitudinally-extending compartment header block 59 is formed from a suitable plastic material such as polycarbonate to include the aforedescribed fluid outlet and inlets and air connections 61, 62 and 63 for each separate fluid compartment 57 and 58. The header block is shaped to include an upper peripheral recessed edge 77 and a wave-like recess 78 extending centrally along the upper face of the block between the opposed longitudinal sides thereof. Mirror-image outside panels 73 and 74 and a compartment dividing wave-like intermediate panel 76 are mold formed with the panels being so configured and sized that the outside panels 73 and 74 provide a rectangular-shaped chamber therebetween which subsequently is divided into two compartments 57 and 58 with the opposed side an bottom edges of the two outside panels 73 and 74 and the intermediate panel 76 in facing relation with each other to be fuse joined in open-ended two compartment relation. In formation, the open-ended edges of the outside panels 73 and 74 and the end portions of intermediate panel 76 are positioned to surround and be sealed to the peripherally surrounding recessed edge 77 of block 59 with the intermediate edge of wave-like intermediate panel 76 nestingly engaging and being sealed to the wave-like recess 78 in header block 59.

In forming cold and hot storage bags 82 and 87, as aforedescribed, two similarly-shaped sheets 102 and 103 of fluid impervious material, such as Mylar, are each sized, shaped and cut as identical plackets to provide bag sides 82 and 87 with a side of a connecting portion 106 therebetween. The plackets are then placed in mirror-image relation and sealed completely along the edges thereof as at 104 so as to provide bags 82 and 87 joined by connecting passage 106 extending therebetween.

Referring to FIGS. 29–32, a novel fluid flow control mechanism 143 for flexible conduits 141 and 142 is disclosed which can be used in place of solenoid 21. These conduits 141 and 142 are used to alternately connect cold storage bag member 82 and hot storage bag member 87 respectively and which are located in storage receptacle 19 to user tap 22. These conduits 141 and 142 are advantageously made of a long-wearing, flexible silicone material inherently capable of emitting a microscopically detectable silicone lubricant when flexed. The conduits are of a preselected thickness in accordance with desired fluid flow capacity from the respective storage bag members 82 and 87 to which they are connected and lead to a liquid outlet and user tap 22 through an appropriate Y-connection (not shown), each passing through the novel fluid flow control mechanism 143 which serves to deliver fluid from each of said storage bag members 82 and 87 alternatively to user tap 22. This liquid control mechanism 143 is comprised of a pair of relatively slidable, superposed plates 144 and 146 which can be mounted appropriately on one of the walls of walled housing 28 with a manual gripping handle 167 mounted on pin 151 projecting through the mounted wall to provide relative slidable movement between plates 144 and 146. Suitably spaced teflon washers 147 can be provided between plates 144 and 146 to space the plates and to enhance relative slidable movement therebetween. Base plate 144, which can be provided at diametrically opposed corners with slots 148 to allow relative movement of this base plate on the wall to which it is mounted, can be of elongated rectangular shape of a preselected length. Superposed plate 146 can be of a shorter length than base plate 144 and can be of S-shape with a width substantially equal to base plate 144. These plates 144 and 146 can be made from a suitable light, sturdy, metallic material. A suitable elongated guide slot 149 is provided in base plate 144 midway between the sides thereof with pin 151 having gripping handle 167 fastened on superposed plate 146 slidably projecting therein. Spaced, elongated guide slots 153 and 154 are aligned with each other on superposed plate 146 and with guide slot 149 on base plate 144. Pins 156 and 157 mounted on base plate 144 project through guide slots 153 and 154 on plate 146 respectively to permit relative slidable movement therebetween. A pair of conduit receiving rings 158 and 159 and a pair of conduit receiving rings 161 and 162 are mounted in staggered positions on each plate 144 and 146 with the rings on corresponding sides of relatively slidable plates 144 and 146 being aligned and so positioned that when the aligned rings 162 and 159 on corresponding sides of the two relatively slidable plates are proximate to each other, then the aligned rings 158 and 161 on the other corresponding sides of the two relatively-slidable plates are remote from each other. These aligned rings are so sized that each pair on corresponding sides has one of the two conduits 141 and 142 passing therethrough. A pair of gripping sleeves 163 and 164, which Can also be of suitable silicone tubing material, are sized to snugly engage the outer peripheries of conduits 141 and 142, and are fastened to the outer peripheries on opposite sides of each ring. Thus each conduit can be properly gripped in a preselectively flexed minimum arc position to be in open position and a preselectively flexed maximum arc position to be in closed position with the open and closed position alternating for each conduit as can be seen in FIGS. 29 and 30 and FIGS. 31 and 32. This serves to allow alternative flow of fluids from storage bag members 82 and 87 in storage receptacle 19. It is to be noted that a suitable helical spring 166 can be arranged to be fastened at one end thereof to actuating pin 151 which pin can be extended, as above described, and can be arranged to project through a wall of the walled housing 28 with a gripping handle 167 fastened thereto. The other end of spring 166 is fastened to pin 157 extending through slot 154 on the superposed plate 146. This helical spring 166 serves to spring bias the relative movement between plates 144 and 146 so that when conduit 142, Which in the embodiment illustrated is connected to hot storage bag member 87 is urged to fully open position as shown in FIGS. 29 and 30, the urging force is against the resistance of the spring biasing means 166. In this regard, it is to be noted that the spring-like effect in each of the silicone conduits also serves to urge each conduit to its selected destined position. Although any one of a number of suitable flexible materials can be selected for flow-through conduits 141 and 142 besides silicone, desirably the conduit material selected should have long-lasting flexing qualities and be of appropriate thickness and characteristics to seal from the center of the axial line of fluid flow through the conduit to the inner peripheral sides thereof. It also is to be noted that the selection of the flexed arc positions of each conduit need not be from an alternative minimum arc, fully-open to a maximum arc, fully-closed position but that in other situation, it would be possible to control the flow somewhere in between these two positions.

From the above description, it can be seen that a novel, light, compact, easy-to-ship, easy-to-store, fluid purification structure and method are provided including numerous inventive features which permit economic manufacture and operation, providing for a highly-efficient and economical system for fluid purification.

The invention claimed is:

1. A liquid purification apparatus comprising:
walled housing means having an ambient inlet opening therein, said housing means defining a plenum chamber preselectively sized to contain a liquid purification system therein to communicatively extend between a liquid inlet and liquid outlet in said walled housing means. A liquid purification system disposed in said housing including a pump to move said liquid from said inlet to said outlet, a liquid storage receptacle having a heat transfer means with a heat exchange element associated therewith and a blower mounted in said chamber in communication with said ambient inlet opening in said walled housing means to circulate air over said heat exchange element;
a walled drain receptacle positioned below and in communication with said plenum chamber with the side walls thereof in spaced relation to said walled housing means to define a linearly extending passage therebetween narrowed sufficiently to provide both sound baffling and air exhaustion, said drain receptacle serving to receive and evaporate condensed liquids from said liquid purification system in said plenum chamber thereabove with said air exhaust passage being sized and positioned adjacent the bottom periphery of said walled housing mean to serve as a dispersing and sound baffling exhaust for air circulated by said blower over said heat exchange element and through the remainder said liquid purification system.

2. The liquid purification apparatus of claim 1; and a clean liquid tap communicatively connected with said storage receptacle downstream thereof.

3. The liquid purification apparatus of claim 1; said liquid purification system within said plenum chamber including a reverse osmosis membrane means having a primary liquid circuit connected between said liquid inlet and said liquid outlet with a secondary treatment system cooperating with said primary circuit to selectively introduce separate treating fluids into said primary circuit to treat said reverse osmosis means including a secondary global loop circuit parallel said primary circuit in by-pass relation to said reverse osmosis means connected between said liquid inlet and said liquid outlet, said treatment system serving to continuously treat said reverse osmosis means when a separate treating fluid is selectively introduced into said secondary treatment system.

4. The liquid purification apparatus of claim 3, said global loop circuit including a drain line, said primary circuit and said drain line having restrictive orifices therein relatively sized to provide a preselected liquid flow between said primary circuit and said drain line.

5. The liquid purification apparatus of claim 3, said global loop circuit including a drain line, said primary circuit and said drain line having restrictive orifices therein of preselected porous material relatively sized and relatively porous to provide a preselected liquid flow between said primary circuit and said drain line.

6. The liquid purification apparatus of claim 3, said treatment system having a header with spaced port connections therefor to receive treating fluids, said treatment system for said liquid purification system including a treatment system header having spaced port connections therein and a unitary disinfection/rejuvenation fluid impervious treatment container having a fluid impervious dividing wall to provide two fluid impervious closed end compartments for introduction of separate disinfection and rejuvenation fluids respectively therein; a pair of compartment headers mounted in sealed relation at corresponding ends of each compartment opposite said closed ends, each compartment header having spaced mating port connections adapted to mate with corresponding spaced port connections in said treatment system header to permit connection of said compartments with said treatment system header.

7. The liquid purification apparatus of claim 6, said port connections for each of said compartment headers of said compartments comprising one side of a plurality of spaced pairs of mirror-image spaced port connection sets in said compartment headers to allow said compartments to be reversed for alternative coupling to correspondingly mating port connections in said treatment system header for alternative introduction of separate liquids into the treatment system.

8. The liquid purification apparatus of claim 6, and a tie down connection means cooperative between said compartment headers and said treatment system header to tie down that compartment header not in use.

9. The liquid purification apparatus of claim 6, said unitary disinfection/rejuvenating liquid container having a longitudinally extending rectangular configuration from said header ends to said closed end in said container with said dividing wall extending therebetween from diametrically opposed corners of said container to provide said fluid impervious compartments, each of said compartments being of generally triangular stable configuration paired in mirror-image relation.

10. The liquid purification apparatus of claim 6, said unitary disinfection/rejuvenation liquid container being formed from three panels of liquid impervious polycarbonate material, two of which are identically sized and geometrically positioned in outer mirror-image relation to initially provide a chamber of longitudinally extending rectangular configuration to include an inlet end adjacent said headers and a spaced opposed closed end with said third panel serving as an inner divider wall being in the form of a wave-shaped sheet to extend longitudinally between said mirror-image positioned first and second panels from said inlet end to said closed end and from diametrically opposed corners of said rectangular chamber formed by said first and second outer panels with the longitudinally extending side and closed end edges of said first, second and third panels extending from said header inlet ends to said opposite closed ends having a common seam and with the edges of all three panels adjacent said header ends being sealed thereto to provide triangular-like mirror-image compartments of stable, configuration extending from said header ends to said closed ends.

11. The liquid purification apparatus of claim 1, said liquid purification system including a reverse osmosis membrane means having a primary liquid circuit connected between said liquid inlet and said liquid outlet and ultraviolet radiation treating means for treating liquid in said system before and after said reverse osmosis membrane means in at least two stages.

12. The liquid filtration and purification apparatus of claim 1, said liquid purification system communicating with a clean liquid tap connected to said storage receptacle downstream thereof and a reverse osmosis membrane means connected upstream thereof between said liquid inlet and said liquid outlet; and, ultra violet radiation treating means for treating liquid in said system before said reverse osmosis means, between said reverse osmosis means and said storage receptacle means and between said storage receptacle and said tap in at least three stages.

13. The liquid purification system of claim 12, said heat transfer means associated with said storage receptacle including a cold side and a hot side with means to pass said liquid through said cold side after ultraviolet radiation treatment between said storage receptacle and before said clean liquid tap.

14. The liquid purification system of claim 1, said liquid storage receptacle including cold and hot liquid compartments, said heat transfer means associated with said storage receptacle having a cold side and a hot side with said cold side associated with said cold liquid compartment and means to pass said liquid through said hot side of said heat transfer means before said hot liquid compartment.

15. The liquid purification apparatus of claim 1, said liquid purification system including a liquid prefilter adjacent said liquid inlet.

16. The liquid purification apparatus of claim 1, said liquid purification system including ion release means to suppress bacterial growth.

17. The liquid purification apparatus of claim 1, said liquid purification system including a liquid prefilter adjacent said liquid inlet and a filter capable of releasing copper ions into said liquid purification system downstream of said prefilter to further suppress bacterial growth.

18. The liquid purification apparatus of claim 1, said liquid storage receptacle including an insulated plenum having a sealed collapsible-expansible fluid impervious storage bag member disposed in said plenum, said bag member being connected in series to said liquid purification system, and control means in said insulated plenum responsive to a preselected liquid volume in said sealed collapsible-expansible bag member to control the amount of liquid flow thereto.

19. The liquid purification apparatus of claim 18, said insulated plenum having passages therethrough to allow chamber communication with ambient.

20. The liquid purification apparatus of claim 18, said control means including at least three spaced switches to determine a common plane so that any one of said switches is responsive to said preselected liquid volume in said sealed bag member.

21. The liquid purification apparatus of claim 18, said storage bag member being of thin polyester material.

22. The liquid purification apparatus of claim 18, said control means comprising a flexible sheet of low magnetic and thermal conductivity positioned above said bag member, said sheet having at least three spaced magnets positioned thereon to determine a common plane and at least three spaced switches aligned therewith to determine a common plane spaced from the plane of said magnets so that preselected movement of only a portion of said flexible sheet causes one of said magnets mounted on said sheet to energize one of said switches to interrupt liquid flow to said bag member.

23. The liquid purification apparatus of claim 18, said liquid storage receptacle including at least two insulated plenums, each plenum having a sealed collapsible-expansible fluid impervious storage bag member disposed therein, said bag members being liquid connected to each other and to said liquid purification system by liquid connecting conduits; said control means in said insulated plenum being responsive to a preselected liquid volume in at least one bag member to control the amount of flow of liquid in both bag members; said heat transfer means associated with said storage receptacles including a cold side and a hot side with one of said two bag members in said insulated plenums being responsive to said cold side of said heat transfer means; and, a heating element in the other of said insulated plenums to heat liquid in said bag member disposed therein.

24. The liquid purification apparatus of claim 23, said bag members comprising a unitary connected bag assembly formed from two similar plackets of fluid impervious material preselectively sized and cut to provide two preselectively-sized bag members with a common passage therebetween when said plackets are joined together in mirror-image relation by a common seam along the edges of the mirror-image facing plackets.

25. The liquid purification apparatus of claim 23, said heating element in said other of said plenums having a controlled heating capacity capable of vaporizing at least some of the liquid therein to pass through said fluid connecting passage in bacterial treated distillate form to the other of said bag members.

26. The liquid purification apparatus of claim 23, said heating element in said other of said plenums of said storage receptacle including an electrically conductive foiled sheet surrounded by silicone insulating tape to have a controlled heating capacity in the range of approximately two hundred fifty to three hundred degrees fahrenheit (250° F.-300° F.) to vaporize at least some of the liquid therein when in liquid water form to pass through said fluid connecting passage as a bacterial treated water distillate to condense in the other of said bag members.

27. The liquid purification apparatus of claim 23, said liquid connecting conduits associated with said storage receptacle including a by-pass conduit having a check valve member therein responsive to a preselected differential pressure between said bag members to open to allow liquid to flow from one of said bag members.

28. The liquid purification apparatus of claim 23, said liquid connecting conduits associated with said storage receptacle including a by-pass conduit with a vertically extending portion thereof having a check valve member therein comprising a break in said by-pass conduit line with opposed ends of said break in said conduit being spaced from each other and having a sleeve connected to said opposed upper and lower ends of said break in said conduit to provide an enclosed chamber therebetween, said enclosed chamber having a float valve disposed therein of preselected size and specific gravity below the specific gravity of the treated liquid to close said upper end of said conduit to further liquid flow until the differential pressure between said bag members to which said conduit is connected reaches a preselected level, said lower end of said conduit being contoured to remain open when said float valve is urged thereagainst by said flow pressure.

29. The liquid purification apparatus of claim 23, said bag members in said storage receptacle each having a flexible liquid flow-through conduit of preselected thickness connecting said bag member to said liquid outlet in said walled housing of said system; and a fluid control mechanism associated with said flow through conduits to deliver liquid from each of said storage bag members alternatively to said liquid outlet.

30. The liquid purification apparatus of claim 23, said bag members in said storage receptacle each having a flexible liquid flow-through silicone conduit of preselected thickness connecting said bag member to said liquid outlet in said walled housing of said system; a liquid control mechanism associated with said liquid conduits to deliver liquid from each of said storage bag members alternatively to said liquid outlet; said liquid control mechanism including first and second relatively-movable gripping means for each of said conduits arranged to grip each conduit at first and second spaced locations on each conduit to cause each of said conduits to be alternatively flexed between a minimum arc open conduit position and a maximum arc closed conduit position to provide fluid flow alternatively from each bag member to said liquid outlet in said housing.

31. The liquid purification apparatus of claim 23, said bag members in said storage receptacle each having a flexible liquid flow-through silicone conduit of preselected thickness connecting said bag member to said liquid outlet in said walled housing of said system; a liquid control mechanism associated with said liquid conduits to deliver liquid from each of said storage bag members in said storage receptacle alternatively to said liquid outlet, said liquid control mechanism comprising a pair of relatively slidable superposed plates mounted on said walled housing means, one of which plates is of elongated shape of a preselected length and breadth and the other of which plates is of S-shape and of different preselected length than the other plate; a pair of conduit receiving rings mounted at diametric positions on each plate with the rings on corresponding sides of said slidable superposed plates being aligned and so positioned that when the aligned rings on one corresponding side of said slidable superposed plates are proximate to each other then the aligned rings on the other corresponding side of each plate are remote from each other, said aligned rings being so sized that each pair of aligned rings on a side has one of the two conduits passing therethrough, a pair of gripping sleeves fastened to the outer peripheries of said conduit on opposite sides of each conduit at a preselected location on each conduit to grip each conduit in minimum-maximum arc positions with one conduit being in minimum arc position and opened when the other conduit is in maximum arc position and closed to allow alternative flow of liquids from said storage bags to said liquid outlet, said slidable plates having spring biasing means mounted on said plates so that during relative movement of said plates urging one of said liquid conducting conduits to maximum arc opened position it is against the resistance of said spring biasing means; and actuating mechanism associated with said plates to cause relative movement therebetween.

32. The liquid purification apparatus of claim 23, said liquid storage receptacle including an intermediate thermally expansible-contractible plate member extending through one portion thereof, said plate member having preselectively sized and positioned passages therein with the bottom wall of said insulated plenums being formed from an insulated plastic material on one face of said plate member and the side and partitioning walls of said plenums being formed on the other face of said plate member from said insulating plastic material connected through said passages in said plate member.

33. The liquid purification apparatus of claim 32, said plate member passages being preselectively spaced slots and circular apertures to permit expansion-contraction thereof and to provide a tortuous heat flow passage between plenums.

34. The liquid purification apparatus of claim 32, said liquid storage receptacle being slidably mounted on a pair of spaced rails in said walled housing means of said liquid purification apparatus, said plate member having a gripping handle to facilitate slidable movement of said receptacle on said rails.

35. The liquid purification apparatus of claim 32, said heat transfer means and said blower being connected to each other and to said plate member.

36. The liquid purification apparatus of claim 1, said liquid purification system including a liquid prefilter adjacent said liquid inlet and a filter capable of releasing copper ions into the liquid system downstream of said prefilter to further suppress bacterial growth, said liquid prefilter and said ion release filter each being disposed in a casing; a frame member to support said pump and said casings for said filters with said casings being spaced and longitudinally aligned on either side of said pump in said frame member, said frame member being disposed within said walled housing means defining said plenum chamber to rest in said housing means so as to dynamically balance and absorb the vibrations of said pump independently of said housing means.

37. The liquid purification apparatus of claim 36, said frame member including a pair of spaced panels having spaced aligned passages therein relatively sized to removably receive and hold said casings in heated spaced relation along either side or said pump supported by said frame member.

38. The liquid purification apparatus of claim 37, said casings being tapered and said spaced aligned passages in said frame member being relatively sized to snugly hold said tapered casings in firmly-wedged position.

39. The liquid purification apparatus of claim 37, said passages having their peripheries lined with a gasket material.

40. The liquid purification apparatus in claim 1, said drain receptacle having spaced protuberances in the side walls thereof to hold said side walls in spaced relation to the walled housing means.

41. A liquid purification apparatus comprising:
walled housing means providing a main plenum chamber preselectively sized to contain a liquid purification system therein to communicatively extend between a liquid inlet in said walled housing means connected to an external liquid source and a liquid outlet in said walled housing means connected to a liquid tap nested in an outside recess of said walled housing means; said walled housing means having an ambient air inlet and including a walled drain receptacle disposed below said plenum defining chamber to receive liquid condensates from said liquid purification system disposed in said plenum defined chamber thereof, said walled drain receptacle means being preselectively sized to allow evaporation of liquid condensates received thereby with the walls thereof being spaced from said walled housing means and including spaces protuberances to provide an exhaust, diverting and sound baffling air passage therebetween; said liquid purification system including in spaced series in a primary conduit line extending between said liquid inlet and said liquid outlet a prefilter, a first helically wound section having one portion of an ultra-violet treating tube extending through the helices of said section; a pump; an ion treatment filter; a reverse osmosis membrane with conduit connected treatment means paralleling said primary conduit line upstream said reverse osmosis means and a secondary global loop conduit paralleling said primary conduit line in by-pass relation to said reverse osmosis means and said treatment means to continuously treat said reverse osmosis means when a separate treating fluid is selectively introduced into said treatment means; a treatment header in said global loop conduit; a treatment container including a pair of fluid impervious compartment having mirror-image compartment headers alternatively connectable with said treatment header; a liquid storage receptacle downstream said reverse osmosis membrane including a collapsible-expansible housing plenum defining chamber having a collapsible-expansible storage bag therein connected in said main line to store a preselected volume of liquid therein, said storage receptacle having a thermo-electric heat sink element with the cool side connected to the wall of said liquid storage receptacle with said primary conduit line passing through said cool side of said heat sink element; a blower disposed in said main plenum defining chamber to direct a stream of cooling air over said heat sink element and through said exhaust and sound baffling passage defined between the walls of said drain receptacle means and said walled housing means; said primary conduit line including a second helically wound section with a second portion of said ultra-violet treatment tube extending through the helices formed by said section upstream said liquid storage receptacle, said primary conduit line further including a third helically wound section with a third portion of said ultra-violet tube extending through the helices formed by said third section downstream said liquid storage receptacle, said primary conduit line extending through said cool side of said thermoelectric heat sink element after said third helically would section and before said liquid outlet and said liquid tap.

42. A compact water purification apparatus for mounting on a table top comprising: walled housing means the walls of which provide a main plenum chamber preselectively sized to contain a water purification system therein to communicatively extend between a tap water supply inlet in said housing means connected to a water supply source for water to be purified and a clean water outlet connected to a clean water tap nested in an outside recess of said walled housing means; said walled housing means including a walled drain receptacle disposed below said plenum defining chamber to receive condensates from said water purification system in said main plenum, said drain receptacle having peripheral side wall members with spaced outwardly projecting protuberances thereon, said drain receptacle being preselectively sized to allow evaporation of condensates received thereby with said outwardly extending protuberances in said side walls of said drain receptacle abutting the inner face of said walled housing means to provide exhaust air diverting and sound baffling air passages between said spaced protuberances; said water purification system including in spaced series in a primary conduit line extending between said water inlet and said water outlet in said walled housing means a prefilter, an ion-treating filter, a first helically wound conduit section in said primary conduit having a first portion of an ultra-violet treating tube mounted in said main plenum extending through the helices of said conduit section, a pump downstream of said first conduit section; a reverse osmosis membrane with conduit connected treatment means paralleling said primary conduit line upstream said reverse osmosis means and a secondary global loop conduit paralleling said primary conduit line in by-pass relation to said reverse osmosis and said treatment means to continuously treat said reverse osmosis when a separate treating fluid is selectively introduced into said treatment means through a unitary disinfection/rejuvenation container, said disinfection/rejuvenation container being formed from three panels of fluid impervious polycarbonate material, two of which panels are identically sized and geometrically positioned in mirror-image relation to initially provide a chamber of longitudinally extending rectangular configuration to include a header end having a pair of compartment headers in sealed relation therewith and a spaced opposed closed end with said third panel being of longitudinally extending wave shape serving as a divider wall to divide said chamber into two compartments of triangular-like configuration each compartment being in communication with a compartment header, each header having a set of spaced ported connections and a tie-down connection therein in mirror-image relation with the longitudinally extending side and closed-end edges of said panels having a common seam and with the edges of all three of said panels adjacent said compartment headers being sealed thereto, said mirror-image compartment headers being alternatively connectible to corresponding mating port and tie-down connections in a treatment header positioned in said global loop of said treatment system for alternative introduction of acid/base treating fluids into the system with the compartment header not connected being tied down; a drain line connected to said primary porous restricting orifices in said primary conduit and said drain line preselectively adjusted with said restriction orifice in said drain line being less porous than said restricting orifice in said primary conduit; a second helically wound section in said primary conduit downstream of said reverse osmosis membrane having a second portion of said ultra-violet treating tube extending therethrough; a walled water storage receptacle positioned in said primary conduit downstream said second helically wound section, said water storage receptacle comprising a divided plenum to provide a larger and smaller compartment, each including a correspondingly sized larger and smaller expansible-compressible Mylar bag member of a bag assembly formed as a unit from placket members with a common seam, said bag members being fluid connected with said larger bag member in said larger compartment serving for cold water storage and said bag member is said smaller compartment serving for hot water storage, said water storage receptacle including an intermediate plate member extending horizontally therethrough, said plate member having a plurality of preselectively positioned passages therein with the bottom wall of said receptacle being formed from foam polyurethane material on the bottom face of said plate member and with said foam polyurethane material extending through said preselectively positioned passages to provide said side walls of said receptacle and a divider wall separating said receptacle into said larger and smaller compartments to house said communicatively connected larger and smaller Mylar bags which in turn are connected to said primary conduit; said plate member having a plurality of slots therein to permit expansion-contraction of said plate member and to provide a tortuous heat exchange passage in said plate member, said plate member further having a finger-grip portion on one edge thereof extending beyond said receptacle; a heat sink element suspended from said plate member including a cold side in communication with said larger compartment to chill said large bag therein and a hot side having a heat exchanger and blower mounted thereto in communication with said ambient air inlet of said walled housing means, said primary circuit passing through said hot side and then to said smaller and larger bag members; said smaller compartment having an electrical heating foil element surrounded by silicone tape to heat said smaller bag member in a controlled manner to distill said water therein with the vapors passing through said communicating passage of said bag assembly to said larger bag member; said primary conduit passing from said larger bag member through a differential pressure actuated check valve in an enclosed chamber between a spaced break in said primary conduit, through said cool side of said heat sink element, through a control mechanism to said clean liquid tap nested in an outside recess of said walled housing means; said smaller bag member in said storage receptacle for hot water storage also being connected through said control mechanism to said clean liquid tap for alternative hot water supply thereto; said liquid receptacle having a foamed polyurethane top cover to close said liquid receptacle, said cover including a recess in the bottom thereof above said larger compartment, said recess having three spaced switches positioned therein in a common plane, a flexible polyester sheet of low thermal and magnetic conductivity fastened to and covering said recess with three magnets position on the upper face of said sheet in spaced, opposed aligned relation with said switches with said lower face of said flexible sheet contacting said larger bag when expanded to urge one of said magnets to actuate an opposed aligned switch and cut-off water flow to said larger bag; said walled housing means including a pivotal front cover wall hinged at one edge thereof for pivotal movement away from an adjacent wall of said housing to permit ready access to said plenum chamber, said pivotal cover wall including a recessed tap support for supporting said clean water tap and being turned at the bottom edge thereof to provide an additional exhaust passage between its inner face and the outer face of said drain receptacle, said cover wall having a transparent panel therein which passes illuminating light from said ultra-violet radiation treatment tube while absorbing radiation therefrom; said treatment tube within said housing and said conduit sections therearound being surrounded by a radiation absorbing and reflecting shield.

* * * * *

UNITED STATES PATENT AND TRADEMARK OFFICE
CERTIFICATE OF CORRECTION

PATENT NO. : 5,017,284
DATED : May 21, 1991
INVENTOR(S) : Steven L. Miller, et al It is certified that error appears in the above-identified patent and that said Letters Patent is hereby corrected as shown below:

Column 17, line 57 (Claim 1), "means A" should read -- means, a --;

Column 23, line 8 (Claim 37), "heater" should be -- nested --;

Column 23, lines 58 and 59 "com-partment" (first appearance in line 59 as "-partment" should read -- partments --;

Column 24, lines 55 and 57 (Claim 42), each appearance, after "osmosis" there should be included -- means --;

Column 26, line 32 (Claim 42) "position" should be -- positioned --.

Signed and Sealed this

Eighth Day of June, 1993

MICHAEL K. KIRK

*Attest:*

*Attesting Officer*

*Acting Commissioner of Patents and Trademarks*